United States Patent [19]

Serbetcioglu et al.

[11] Patent Number: 5,511,111
[45] Date of Patent: Apr. 23, 1996

[54] CALLER NAME AND IDENTIFICATION COMMUNICATION SYSTEM WITH CALLER SCREENING OPTION

[75] Inventors: Bekir Serbetcioglu, Huntington; Ilhan Bagoren, Beacon Falls, both of Conn.; Osman Duman, Norwood, Mass.; Esref Ozulkulu, Monroe, Conn.

[73] Assignee: Engineering and Business Systems, Inc., Shelton, Conn.

[21] Appl. No.: 147,346

[22] Filed: Nov. 1, 1993

[51] Int. Cl.⁶ ............................. H04M 1/64; H04M 1/66
[52] U.S. Cl. ................... 379/67; 379/89; 379/142; 379/211; 379/212; 379/215
[58] Field of Search .................. 379/67, 88, 89, 379/215, 142, 210, 211, 212, 249

[56] References Cited

U.S. PATENT DOCUMENTS

| | | | |
|---|---|---|---|
| 4,696,028 | 9/1987 | Morganstein et al. | 379/88 |
| 4,893,329 | 1/1990 | O'Brien | 379/88 |
| 4,922,490 | 5/1990 | Blakley | 379/215 |
| 4,975,941 | 12/1990 | Morganstein et al. | 379/88 |
| 5,008,929 | 4/1991 | Olsen et al. | 379/112 |
| 5,058,152 | 10/1991 | Solomon et al. | 379/67 |
| 5,127,043 | 6/1992 | Hunt et al. | 379/88 |
| 5,222,125 | 6/1993 | Creswell et al. | 379/67 |
| 5,243,643 | 9/1993 | Sattar et al. | 379/88 |
| 5,329,578 | 7/1994 | Brennan et al. | 379/211 |
| 5,361,295 | 11/1994 | Solomon et al. | 379/67 |
| 5,375,161 | 12/1994 | Fuller et al. | 379/142 |

*Primary Examiner*—Jeffery Hofsass
*Assistant Examiner*—Fan Tsang
*Attorney, Agent, or Firm*—Ohlandt, Greeley, Ruggiero & Perle

[57] ABSTRACT

The present invention provides a caller name delivery service telecommunication system having caller screening and other options. The system includes intercepting a call from a calling subscriber to a desired called subscriber, as a first option, prompting the caller to either speak his or her name, or speak or punch a pin number as a second option, reviewing caller screen and caller pass-through lists to determine whether the intercepted call is on either list, playing a called subscriber announcement requesting voice identification of the calling subscriber, recording the voice identification on a recording medium, transmitting to the called subscriber the recorded voice message, recording the telephone number of the calling subscriber and playing the voice identification in a voice format by means of text to speech or recorded digits to speech technology, and requesting the called party to accept the call by a plurality of different options. The present invention also includes a method for telecommunications involving caller name delivery services.

24 Claims, 24 Drawing Sheets

AIN Architecture

AIN Architecture

——— SS7
- - - - Voice/Data Path

AIN Architecture

AIN Architecture

AIN Architecture

AIN Architecture

CALLER NAME AND IDENTIFICATION COMMUNICATION SYSTEM WITH CALLER SCREENING OPTION

BACKGROUND OF THE INVENTION

1. Field of the Invention

The present invention relates generally to a telecommunication system and, more particularly, to a caller name and identification announcement communication system having a caller screening option. The present caller name communication system relates to voice and data networks and provides the called party with the ability to screen his or her telephone calls before accepting any call. Also, the present caller name communication system includes a feature server or access controller that permits the subscriber, if desired, to screen callers or pass-through the caller's telephone call by-passing the screen caller service. Furthermore, the caller may be prompted to enter his or her personal identification number (PIN), or speech recognition technology to detect the callers voice signature, and to immediately by-pass the caller screening option and, thus, have immediate direct connection. This ability is presently achieved by adding the feature server to an existing network, without any modification to any element or component of the network or a subscriber's equipment. It is anticipated that this feature server will, in the future, be an integral part of the switch means in the telecommunication system taking full advantage of intelligent networks (IN) and/or advanced intelligent networks (AIN) or caller line identity (CLI). Thus, the present invention relates to a telecommunication system that includes a caller name and identification announcement and screen caller features and provides a multitude of delivery and screen caller services not now available on an integrated basis.

2. Description of the Prior Art

A variety of telephone or telecommunication services have been available in this and other countries to individual subscribers on a per service basis. That is to say, a typical telephone company will offer a service, such as, for example, call forwarding, that enables a subscriber to be at a different location from his or her regular home or office and still be able to receive the incoming call. However, call forwarding conventionally requires the subscriber to notify the central or other suitable office that calls will be taken at the call forwarded number. Further, there has not, heretofore, been any provision for the combination of the voice announcement of the caller party name and the calling line identification, as well as the number of other delivery, screen caller and by-pass options available in the present system.

Specifically, the wireless and wireline telecommunications network comprises offices through which telephone calls are routed. Each office is owned by a telephone company that participates in the network. Any subscriber connected to these offices can call another subscriber and can receive calls from another subscriber. Each time a call is initiated, it will be routed to the called party. A ring signal at the called party's telephone will indicate to the called party that a call is pending. The called party will off-hook his or her handset to accept the call. As is known, off-hook is defined as a detection that the telephone handset is being lifted to release the cradle or the acceptance of the call by pushing a certain key, such as, the send button of a cellular telephone, or by flipping the mouthpiece of the telephone.

Although today there are some provisions to deliver the caller line identity (CLI), which is commonly known as automatic number identification (ANI), to the called party prior to his or her acceptance of the call, this technique requires the telephone equipment of the called party to have certain, special features. The CLI is generally the ISDN number of the calling party (with possible additional information, i.e. sub-address) which may be provided by the network or partly by the calling party, while the ANI is a more general terminology in referring to the calling party in different protocols with different formats. It should be noted that the terms CLI and ANI are used interchangably in this application. In addition, some of the components of the telecommunications network in the United States and other countries do not support delivery of the CLI. The caller line identity (CLI) means the information carried from the originator or caller's telephone switch, if applicable, identifying the telephone number of the calling telephone. (It should be noted that certain countries and states presently allow the users to disable the delivery of this number to the end users by certain arrangements with the local telephone companies).

U.S. Pat. No. 4,696,028 to S. J. Morganstein, et al., which issued on Sep. 22, 1987, titled: PBX Intercept And Caller Interactive Attendant Bypass System, and U.S. Pat. No. 4,975,941 also to S. J. Morganstein, et al., which issued on Dec. 4, 1990, titled: Call Processor For Facilitating Call Completions, which is a continuation of the application that resulted in U.S. Pat. No. 4,696,028, are directed to an intercept system for integrating the personalized services of switchboard attendants with on-premises PBX switching systems with the capabilities of the intercept system that allows the calling party to complete the call to the on-premises switching system provided extension numbers of the called parties are known. The system intercepts the incoming call and establishes a bidirectional communication path between the caller and the intercept system. A digital announcement circuit transmits an instructional message to the caller requesting the caller to dial the desired extension number and a DTMF receiver collects the dialed extension number digits.

U.S. Pat. No. 4,893,329 to T. D. O'Brien, which issued on Jan. 9, 1990, titled: Call Deferral System For Telephones is directed to call deferral system in which a call can be deferred for a selected period of time that can be either the time at which the user desires for the call deferral to end or the period during which it is to be in effect. This system includes DTMF decoder and a speech synthesizer.

U.S. Pat. No. 5,058,152 to M. Solomon, et al., which issued on Oct. 15, 1991, titled: Anonymous Interactive Telephone System Having Direct Connect Feature, is directed to a method and apparatus for establishing telephone communications between anonymous service subscribers and responding callers over public telephone lines. The system permits mutually anonymous parties to conduct telecommunications with each other, and without the need to divulge the telephone number of either party. The system can enable a subscribing caller to place calls to persons having caller identification telephone equipment capable of identifying the telephone numbers of the callers.

U.S. Pat. No. 5,222,125 to C. W. Creswell, et al., which issued on Jun. 22, 1993, titled: System For Providing Personalized Telephone Calling Features, is directed to a common adjunct switch that is integrated into a telecommunications network that allows a subscriber to control the manner in which a telephone call is received. In particular, when a call identified by a service telephone number is received by the adjunct, the adjunct advances the call to the associated service subscriber's home telephone station set if the caller is not the service subscriber. If the caller is the service subscriber, the adjunct transmits an announcement providing a menu of personalized calling services that the subscriber may program to customize the manner in which the subscriber receives the call from the adjunct. Such personalized services include call forwarding and call screening. Also, the system permits the subscriber to place via the adjunct a telephone call to either the subscriber's home telephone station set or another telephone station set.

U.S. Pat. No. 5,243,643 to S. Sattar, et al., which issued on Sep. 7, 1993, titled: Voice Processing System With Configurable Caller Interfaces, is directed to a voice mailing processing system that communicates to callers through a digital computer common-platform. This system provides for flexible and user configurable caller interfaces.

Clearly, the problems of the prior art are not solved by ally one of these patents. Solutions to these problems are, however, solved by the present system in which a network based feature server intercepts an incoming call for a called subscriber and prompts the caller to either speak his or her name, or speak or punch a pin number. If the pin number is entered or the spoken name is recognized by the speech recognition technology, then the called party's profile will be checked to determine whether there is authorization. If there is authorization, the call will be directly routed. In the case where the called party speaks his or her name, the spoken name is then recorded and a new call is initiated to the called party. There is also anticipated a further option where telefax and modem calls are screened by listening to the line. If it is a telefax call, it will be directed to a selected telefax line, whereas if it is a modem call, it will be directed to a selected modem line. If it is neither, service will simply continue.

Once the called party answers, the recorded name is played back and the digits of the caller's line will be transmitted, provided CLI is present and CLI delivery to the called party is enabled. The called party can accept the call by staying on the line or pushing a certain key, or can redirect the call to other numbers as follows. The voice menu provides several options anyone of which can be followed by dialing or speaking the digits or speaking the name of the redirected telephone (e.g. home, office, gym, etc.) or redirect it to a preselected default number preprogrammed by the subscriber (e.g. voice mail system) by hanging up. During this period, the caller will be given a special tone or voice announcement or music as an indication that the system is tracking the called party.

The present system is a network component or network component adjunct that provides extensive features to the network or to the adjunct node. It can add new network services without altering the basic functionality of the existing network components or elements, such as, for example, switches. Thus, the present invention circumvents (a) the need of special capabilities on the called party or calling party equipment, (b) capability of the telecommunications network to transport the CLI, and (c) the legal issues surrounding the delivery of the CLI without the calling party's permission because it uses, for the most part, voice transport and voice store and retrieval capabilities. This system is also superior to the caller line identity (CLI) delivery because CLI only indicates the telephone number the call is initiated from, while the present system delivers both the originating telephone number whenever available, and the spoken name of the caller. In addition, the present system can be connected to any of the various nodes, such as end offices, access tandem, tandem, toll offices, mobile switching centers (MSC), key telephones or PBX's or customer premises switches and other network nodes capable of transporting or switching voice and data. Alternatively, the feature server can be built into the nodes defined above or into the voice mail (VM) or interactive voice response (IVR) available from other parties. Furthermore, the feature server can take advantage of the IN/AIN capabilities of the end of offices and control them to switch the call to interactive voice response or voice mail, which are generically known as intelligent peripheral (IP), or other telephone numbers using adjunct or service control point (SCP) interfaces specified in IN/AIN specifications.

SUMMARY OF THE INVENTION

Against the foregoing background, it is a primary object of the present invention to provide a new service to telephone users.

It is another object of the present invention to provide such a new service or system that includes voice announcement of the caller's name, a short message or his or her spoken name from the caller and the caller line identity whenever available and permitted.

It is still another object of the present invention to provide such a new system that also provides options whether to accept the call, or redirect the call to a number of different numbers or equipment.

It is a further object of the present invention to provide such a new system that has the options, if desired, to screen the caller or pass-through the caller such that calls from certain CLIs are automatically disabled while calls from other CLIs are automatically accepted.

To the accomplishments of the foregoing objects and advantages, the present invention, in brief summary, comprises a system that intercepts a call, receives the caller line identity, if any, and prompts the caller to either speak his or her name, or speak or punch a pin number.

If a pin number is entered or speech recognition technology is used to verify the privileges of the caller by matching the caller's spoken name to the previously programmed names, then the called party's profile will be checked to determine whether there is authorization. If there is authorization, the call will be directly routed. In the instance where the called party speaks his or her name, the spoken name is then recorded and a new call is initiated to the called party.

A further option is where telefax and modem calls are screened by listening to the line. If it is a telefax call, it will be directed to voice mail if it is operatively connected to the telefax line or to a selected telefax line. If it is a modem call, it will be directed to a selected modem line. If neither, service will simply continue.

As another option, the system checks the caller screen list and the pass-through list to determine whether to establish direct connection or use the present system or otherwise prompts the caller to speak his or her name. If the call is on the pass-through list, the system establishes a direct connection between the calling subscriber or party and the called subscriber or party. If the call is on the caller screening list, the system sends the call to the preprogrammed number, such as voice mail.

The system also comprises (a) means for recording the caller's name or time out if no one speaks, (b) means for initiating another call to the called party, (c) means for playing the recorded caller's name, (d) means for playing the caller line identity, if available and allowed to be delivered, using digits and speech conversion, and (e) means for prompting the called party to accept the call by taking action. Such actions include: (1) waiting without any action for a period of time, (2) entering a digit or speaking "yes" or "no", (3) redirecting it to a voice mail system (VM) or another telephone number by hanging up, or (4) selecting other options for redirection using Dual Tone Multiple Frequency or Multifrequency (DTMF) or speech recognition or grunt detection technologies.

As is known in the art, DTMF is the distinct tones generated and detected by telephone and switching equipment, such as, interactive voice response (IVR) and voice mail (VM) and the like. These tones are generated as a superimposition of two frequencies assigned to the digits 0 to 9 and the number keys.

As is also known in the art, IVR is a device that accepts calls and performs a dialogue with a user and plays pre-recorded announcements, receives digits or records voice messages, for the purpose of collecting information automatically. The IVR also incorporates modem, telefax detection, speaker dependent, independent speech recognition and grunt detection technologies. (Grunt detection means detecting any sound against silence of a certain period of time.) Also, the VM is a device that accepts calls and records voice, telefax and data messages for later playback and accepts calls from a mailbox owner for administrative purposes, such as, for example, playback, forward, store and delete messages. The IVR can interact with the users by playing voice menus and collecting spoken or DTMF digits, grunt detection, time-outs or spoken words.

Thus, the present invention is a telecommunication system involving caller name delivery and caller screening services. The system comprises: means for intercepting a call from a calling subscriber to a desired called subscriber; as a first option, means for prompting the caller to either speak his or her name, or speak or punch a pin number; as a second option, means for reviewing caller screen and caller pass-through lists to determine whether the intercepted call is on either list; means, responsive to receipt of the intercepted call, for playing a called subscriber announcement requesting voice identification of the calling subscriber; means for recording the voice identification on a recording medium; means for initiating a call to the called subscriber and transmitting to the called subscriber the recorded voice identification; and, means for requesting the called party to accept the call. The telecommunication system further comprises means, responsive to the requesting means, for recording the telephone number of the calling subscriber and playing the recorded number in a voice format by means of either text to speech or recorded digit to speech technology whenever applicable, that is, when permission is not required, and in the telecommunication system the initiating means transmits the recorded voice identification and recorded telephone number. Further, the requesting means requests or prompts the called party to accept the call by selectively (1) dialing a digit, (2) speaking a digit, prompting with "yes" or "no", (4) grunt detection, (5) speaking the name of the place or person to reroute or (6) staying on the line for a predetermined period of time, during which time the call will be transferred to VM, if so programmed, or to an alternative number if the called subscriber does not answer or hangs up.

The present invention also provides a telecommunication method involving caller name delivery services. The method comprises: intercepting a call from a calling subscriber to a desired called subscriber; playing a called subscriber announcement requesting voice identification from the calling subscriber of the intercepted call; recording the voice identification from the calling subscriber on a recording medium; initiating a call to the called subscriber and transmitting to the called subscriber the recorded voice identification; playing the voice identification in a voice format by means of text to speech technology whenever permitted; and requesting the called party to accept the call by selectively pushing a key or staying on the line for a predetermined period of time, during which time the call will be transferred to VM or to an alternative number if the called subscriber does not answer or hangs up.

The method further comprises, after interception of the call, prompting the caller to either speak his or her name, or speak or punch a pin number. Should the pin number be entered or the spoken name matched to the programmed speech templates, then the called party's profile will be checked to determine whether there is authorization to route the call. If there is authorization, the call will be directly routed. In the case where the called party speaks his or her name, the spoken name is then recorded and a new call is initiated to the called party. The method may also comprise, after the prompting step, screening for telefax and modem calls by listening to the line.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

BRIEF DESCRIPTION OF THE PREFERRED EMBODIMENTS

Figure 1:
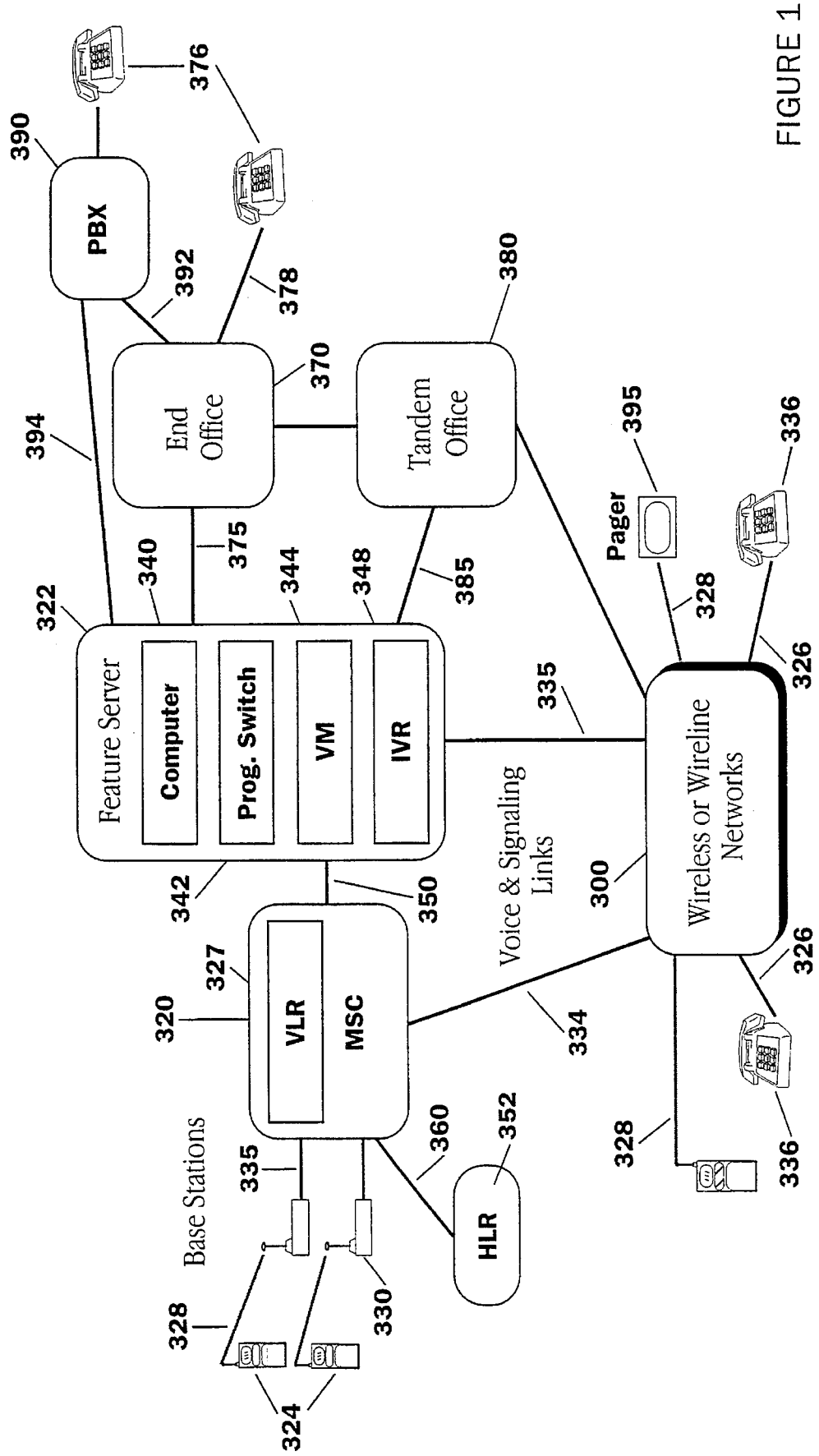
FIG. 1 is a schematic of a telecommunication network that includes the present system as a component.

Referring to the drawings and, in particular, FIG. 1, a telecommunications system or network (TN) includes, as a component or element, the system or component of the present invention. The telecommunications network, or wire (wireline) or wireless networks, is generally represented by reference numeral 300. The components of the network 300 are interworking nodes and networks connected by telecommunication links or telecomlinks. These telecomlinks provide voice and data communications. Each node provides a specific service to support a call. It should be understood that the wire or wireless networks 300 box in FIG. 1, stands for the entire variety of conventional nodes, networks or components found in a conventional telecommunications system including the conventional components shown in greater detail in the remainder of FIG. 1. As such, the components of the network 300 can be connected directly or indirectly to any other component in the network, as discussed below.

As shown in FIG. 1, the telecommunications network 300 provides a mobile switching center (MSC) 320 as the switching center for providing access to the access controller or feature server 322 that will incorporate features of the present system. As shown in FIG. 1, the MSC 320 also provides access to each base station 330 by link 335. The base stations 330 are connected to subscriber stations 324 by wireless links 328 shown as dotted lines. The wire or wireless networks 300 are linked to the MSC 320 and the feature server 322 by broad band Cables 334 and 335, respectively, and outward to subscriber sets 336 by links 326.

The MSC 320 is a switch that accepts a user's request for call service, handoffs and receives calls when the user crosses a mobility boundary, locates the users home database or home location register (HLR) and queries for current address, and maintains the current set of visitors in the visitor database or visitor location register (VLR) 327. The MSC 320 is a conventional switch presently sold by Northern Telecom, AT&T, Audoplex, Alcatel and other known manufacturers. It is programmed as sold, but includes different additional features that will be used by the present system based on the node. It should be noted that the MSC 320 permits the use of two different numbers per each individual, namely the actual assigned to the subscriber and a second logical number.

VLR 327 is a network element or component that stores transient formation relating to the location of a user who is visiting the area, whereas the HLR 352 is a network element or component that stores transient information relating to a user at a fixed home address. The VLR 327 is located in the MSC 320, whereas the HLR 352 is accessed by the MSC 320 via link or connection 360. Both the VLR 327 and the HLR 352 can be either a part of the MSC 320 or can be external and connected to the switch. As shown in FIG. 1, the VLR 327 is internal and the HLR 352 is external, and connected to the MSC 320.

The feature server 322 includes a general purpose computer 340 that provides the necessary call control to the system 300 in order to effectuate a variety of functions suitably programmed and, in general outline, shown in FIG. 2. The feature server 322 also includes a programmable switch 342, voice mail means (VM) 344 and interactive voice response means (IVR) 348 that are operatively connected to the computer 340 by conventional wiring so that the computer can appropriately control each.

The VM 344 and the IVR 348 are each directly connected to the programmable switch 342 by conventional connection means. The broad band cable means 350 connects the access services 322, via switch 342, to the MSC 320. It is also possible to connect the VM 344 or the IVR 348 directly to the MSC 320.

The computer 340 is a device that provides the computational intelligence and implements feature service algorithms by programmed commands. The computer 340 of the present system 300 is a conventional computer that is presently sold by SUN, HP, Motorola, IBM, Stratus and Tandem and other known companies.

The VM 344 and the IVR 348 are conventional components. The VM 344 is presently sold by Converse Technology, Boston Technology, Octel and other known manufacturers, while the IVR 348 is presently sold by VBMS, Periphronics and other known manufacturers.

The programmable switch 342 is a switch whose functions can be controlled from the computer 340. The programmable switch 342 is a conventional switch that is presently sold by Excel, Summa Four, Harris Corporation and other known manufacturers. If the MSC or the other offices feature server is connected and is capable of providing IN/AIN interface than alternatively the feature server will control those switches instead of employing its own switch.

An end office 370 is a switch that is directly connected to, as shown by link 378, or part of a user set 376. The programmable switch 342 of the feature server 322 is operatively connected to or obtains access to the end office 370 by link 375. The tandem office 380, on the other hand, is a switch that is not directly connected to the user, and can interconnect other switches. The feature server 322 is operatively connected to or obtains access to the tandem office 380 by link 385.

The end office 370 and the tandem Office 380 are conventional switches. The end office 370 switch is presently sold by Northern Telecom as DMS 100, AT&T as 5ESS, Siemens as EWSD, Alcatel as System 12, Ericsson and other known manufacturers. The tandem office 380 switch is presently sold by Northern Telecom as DMS 200/250, AT&T as 4ESS, Siemens as EWSD, Alcatel as System 12 and Ericsson and DSC corporations, and other known manufacturers.

It is important to note that the feature server 322 can be connected to the MSC 320, the end office 370 or any other switch alone, or it can be connected to several switches at the same time. The particular connection shown in FIGS. 1 and 3A to 3L is by way of example and is preferable for a cellular phone scenario.

The system can access a PBX (private branch exchanges) or keyphones 390 that are switches in telephone sets 376 at customer or subscriber's premises. The PBX 390 can be accessed from the end office 370 by link 392 or directly from the feature server 322 by link 394. The PBX 390 is a conventional switch that is presently sold by Northern Telecom Meridian or SL1, AT&T Definity or other known manufacturers.

All switches are devices for connecting one port to another for the purpose of transmitting information. It should be noted that the switches may or may not have stored program intelligence to implement call service algorithms.

The system can also access a pager 395 which is a device that receives information and displays it. As shown in FIG. 1, the pager 395 can be accessed in the wire or wireless networks 300 by link 328. The pager 395 is a conventional pager.

As stated above, the telecommunications network 300 shown in FIG. 1, illustrates the present system, especially the feature server or access controller 322 for a cellular telephone users. It should be understood that the present system or service can be provided not just to the cellular subscribers or users, but also the personal communications, 500 number customers and the landline subscribers. When used in these other users, the feature server or access controller 322 would simply be connected to different nodes in the telecommunications network 300 to serve these different customers.

Figure 2A:
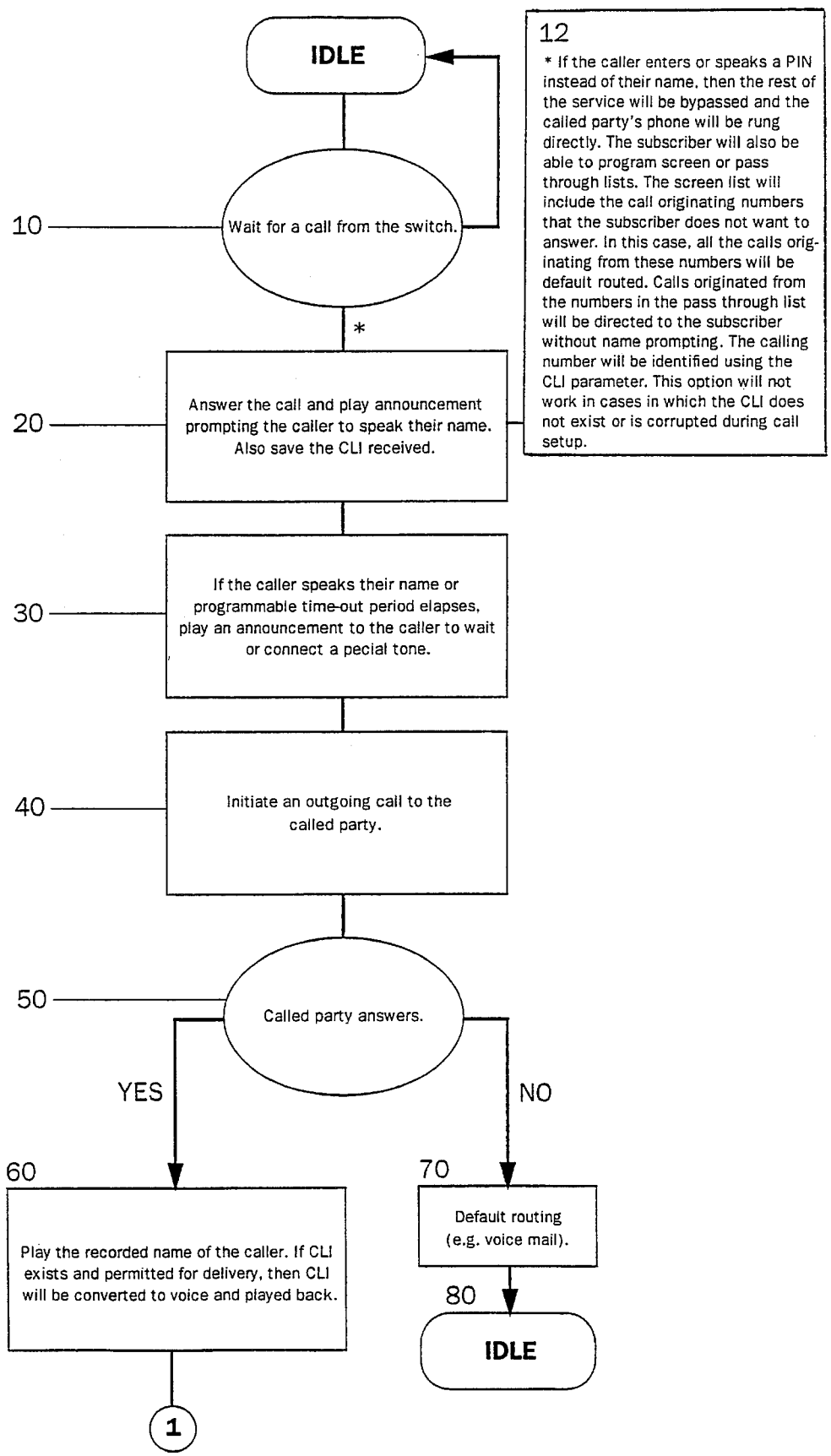
FIG. 2 consists of FIGS. 2A through 2C that together are a flow diagram of the present system.

FIG. 2 provides the sequence of steps of the present system once the original call from the caller has been received by MSC 320. As shown in FIG. 2A, the system waits for a call from the MSC 320, shown as 10, and, if programmed, and prompts the caller to either speak his or her name, or speak or punch a pin number. If the pin number is entered or the spoken name is recognized, then the called party's profile will be checked to determine whether there is authorization. If there is authorization, the call will be directly routed. In the case where the called party speaks his or her name and it is not recognized, the spoken name is then recorded and a new call is initiated to the actual number of the called party. There is also anticipated a further option where telefax and modem calls are screened by listening to the line. If it is a telefax call, it will be directed to a selected telefax line, whereas if it is a modem call, it will be directed to a selected modem line. If it is neither, service will simply continue.

If the number is not in the pass-through list then the CLI will be checked against the screen caller list. If the CLI is in the screen caller list, the call will be connected to the preprogrammed default number, such as voice mail. Then, the system answers the call and plays the announcement prompting the caller to speak his or her name, shown as 20. If a CLI is received, it will be saved. Next, the caller speaks 30 his or her name or, alternatively, a desired timeout period elapses. This timeout period is programmable as desired by the called subscriber. After either the caller speaks or the timeout period elapses, an announcement is played to the caller to wait or to connect a special tone. A signal is then sent to initiate an outgoing call to the called party, shown in 40. The called party answers 50 and if the answer is "yes", step 60 is followed, and if the answer is "no", step 70 is followed.

In step 70, the call is directed to its default routing, such as the VM 344 and then back to the initial or idle position 80 prior to receipt of the call from MSC 320.

Figure 2B:
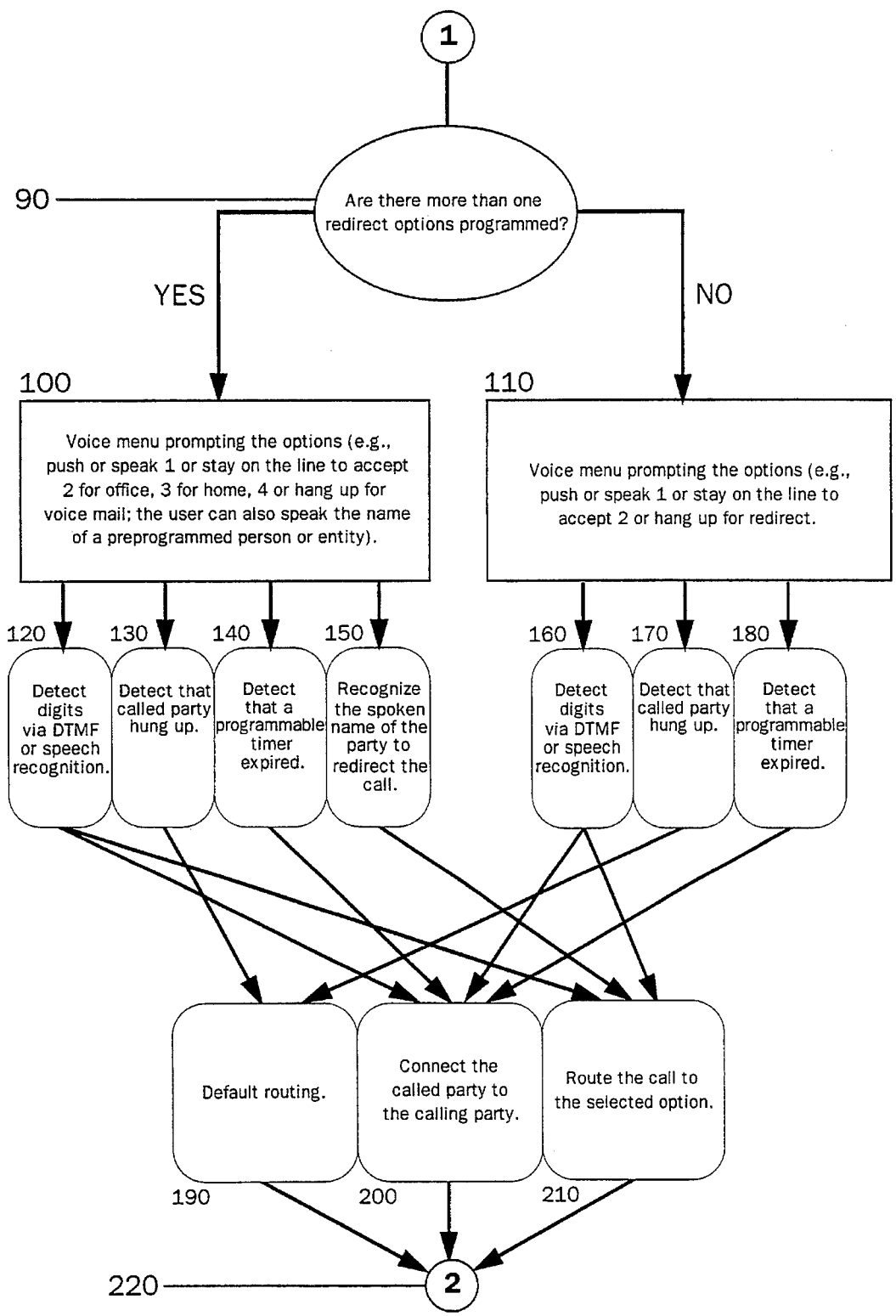

In step 60, the recorded name of the caller is played. If there is a CLI that is permitted to be delivered, the CLI will be converted to voice and played back. Then, as shown in step 90 in FIG. 2B, it is determined whether there are more than one redirect options programmed. If the answer is "yes", the call is routed to step 100 and then directly to steps 120, 130, 140 or 150 depending on the response at 100. Thereafter, it advances to 190, 200 or 210, as shown in FIG. 2B, depending on the previous response.

Likewise, if the answer is "no" at step 90, the call will proceed to step 110 and then 160, 170 or 180 depending on the response. From these latter steps, it will proceed to 190, 200 or 210.

Figure 2C:
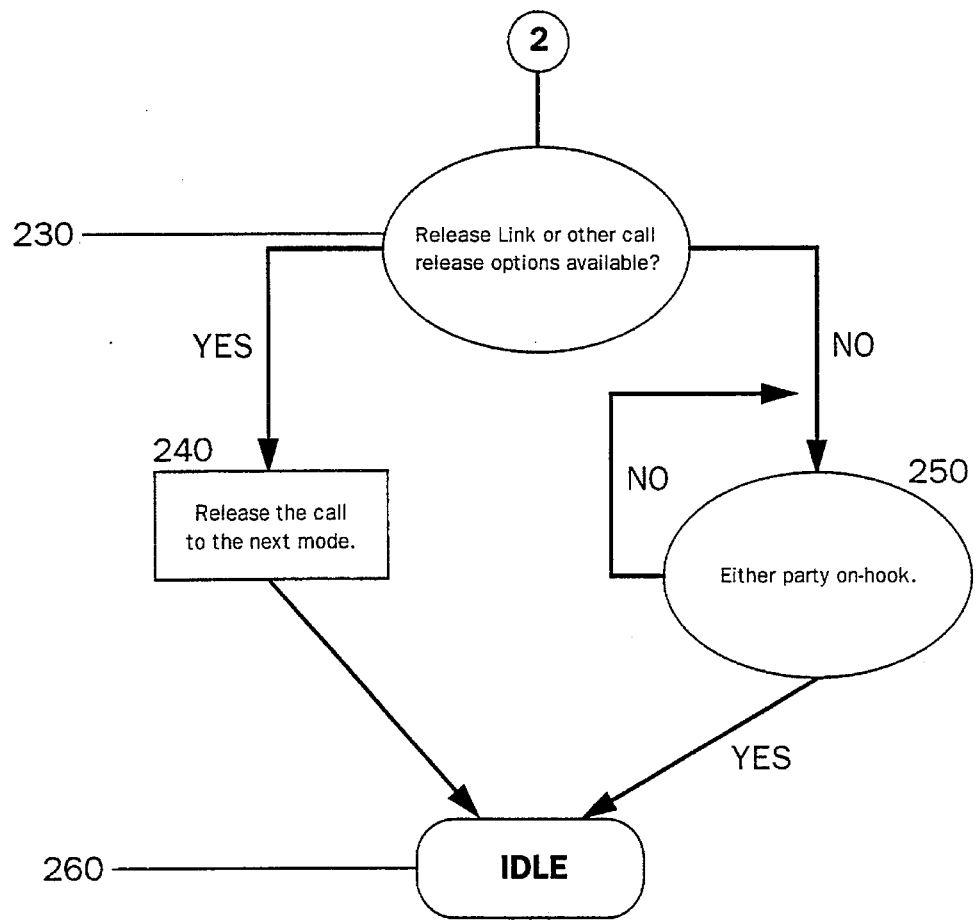

In either event, the call results at 220 and from there, as shown in FIG. 2C, it arrives at 230 where it is determined whether the release link or other call release options are available. If the answer is "yes", the call is released to the next node 240 and then returns to the idle position. If the answer is "no", the call moves to 250 where it is determined whether either party is terminating the call, i,e. on-hook. If the answer is "yes", the system proceeds to the originator or idle position.

Figure 3A:
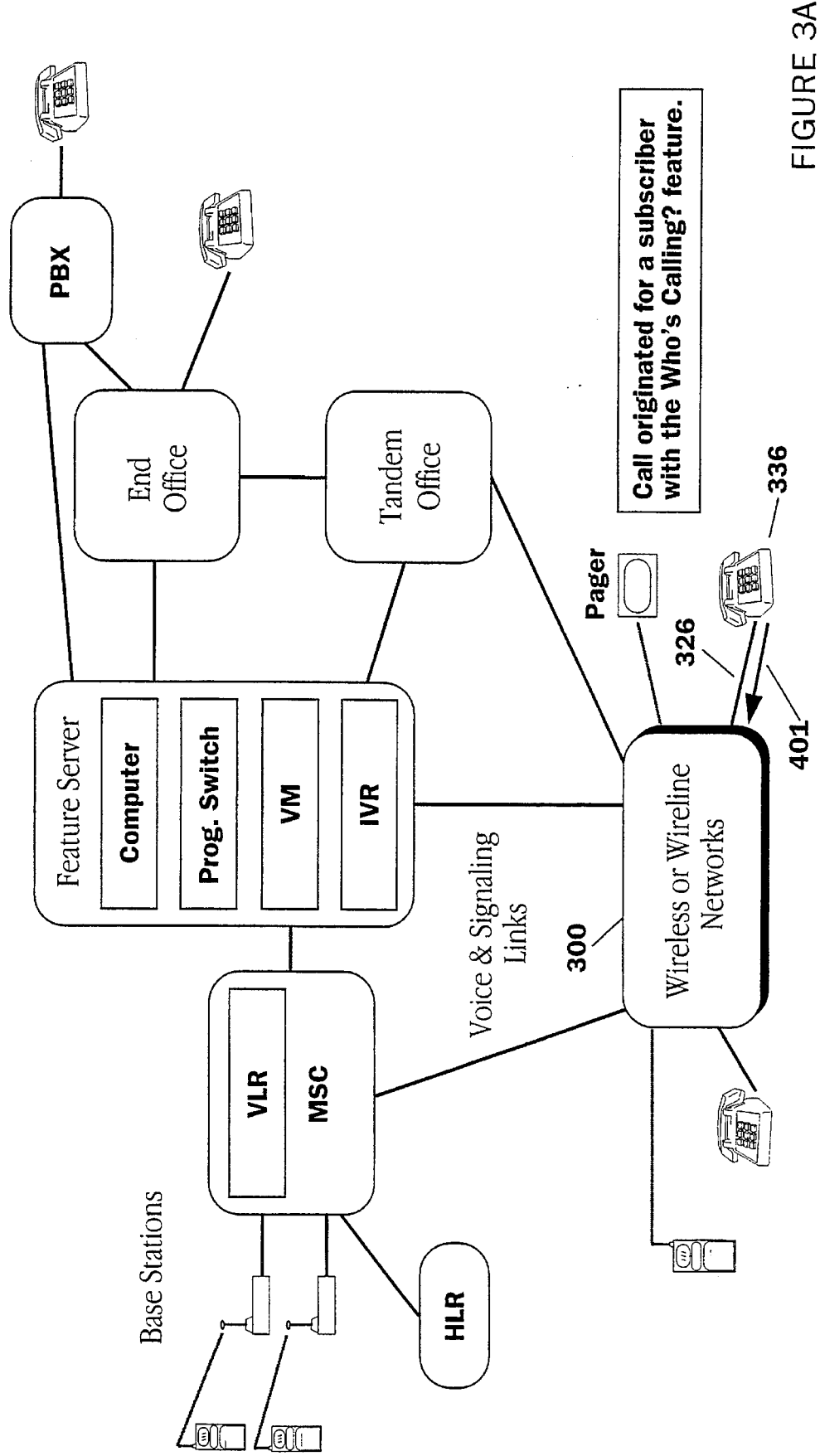
FIG. 3 consists of FIGS. 3A through 3L that are schematics of each step of a call using the present system.
Figure 3B:
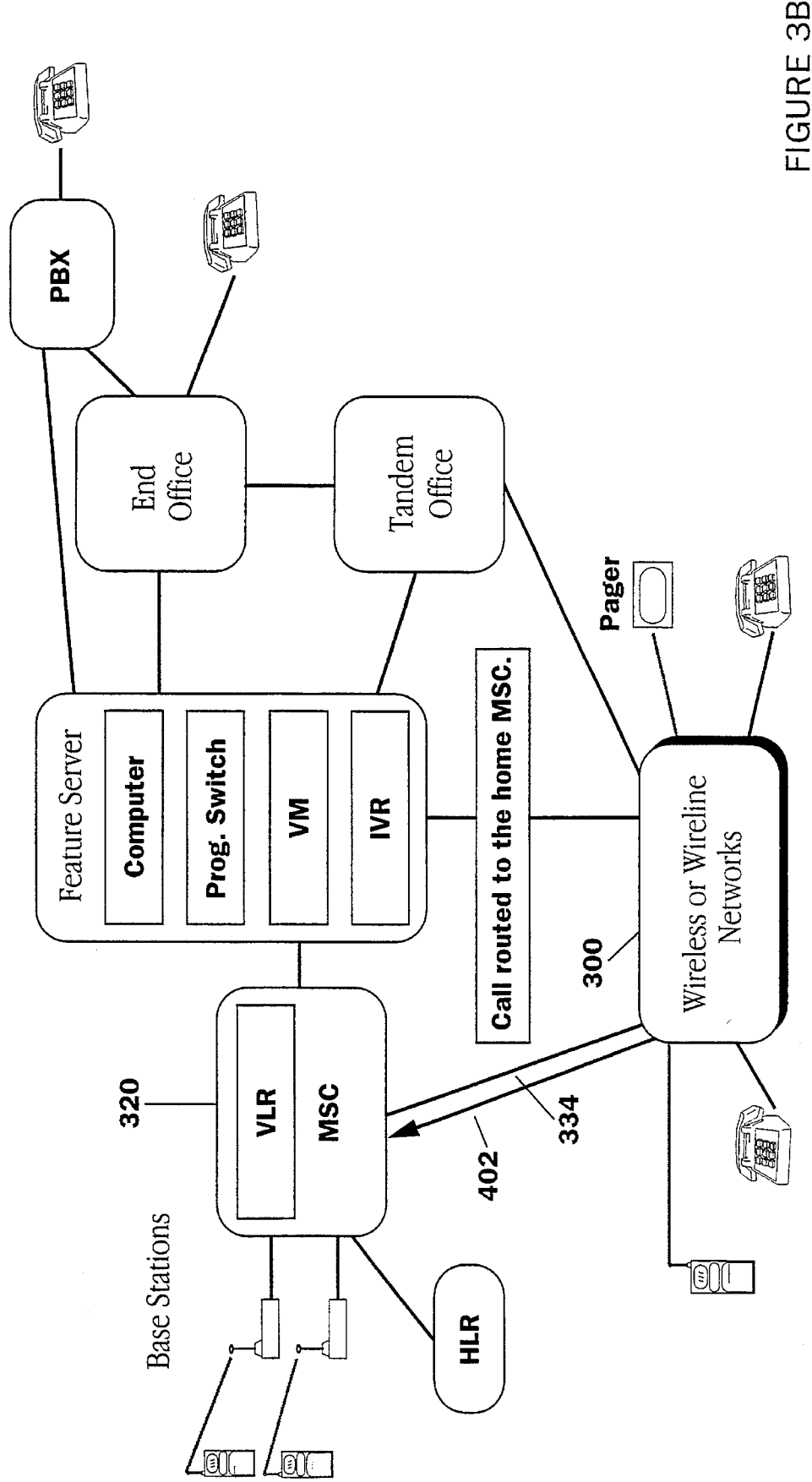
Figure 3C:
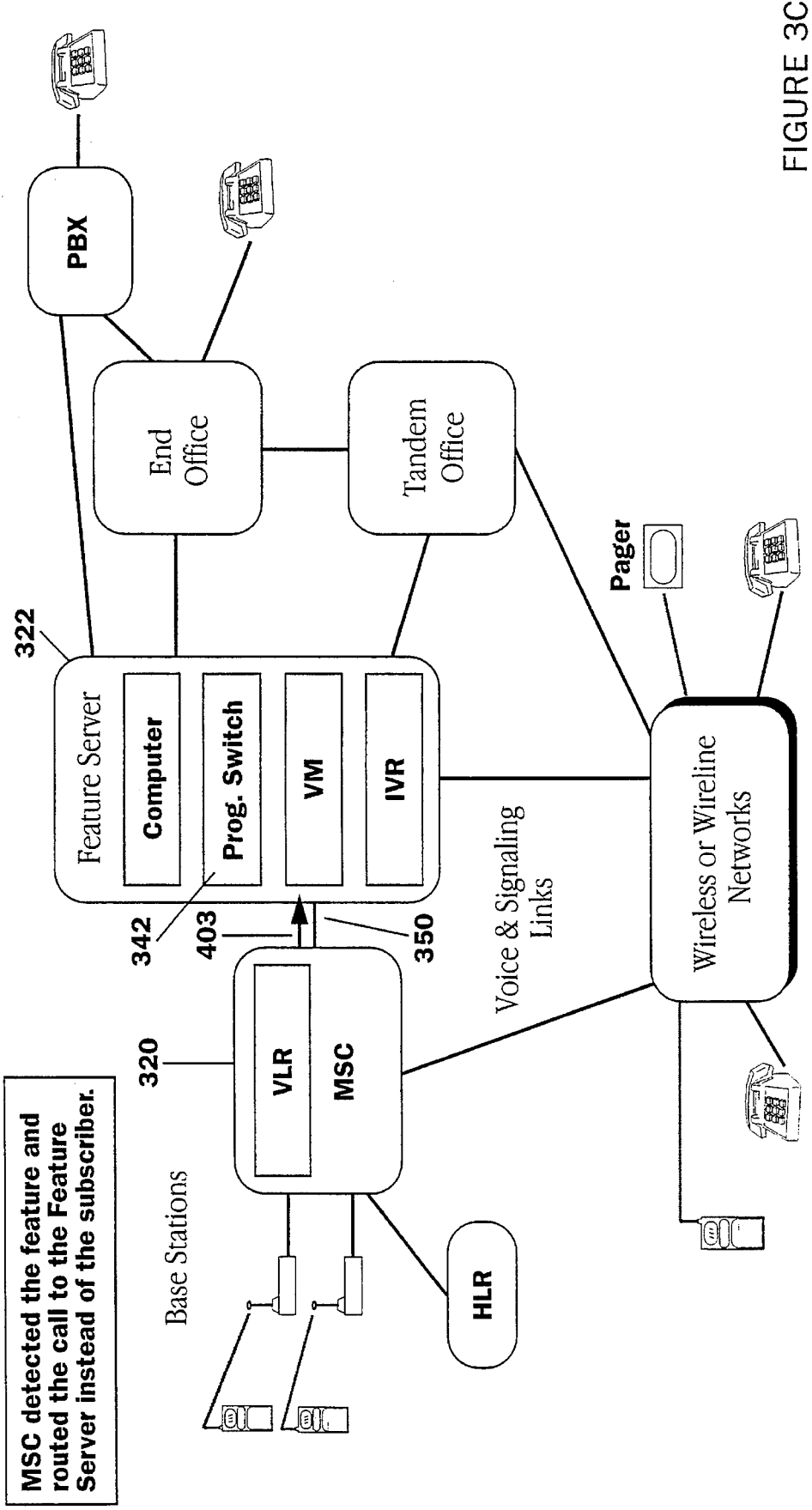

FIGS. 3A through 3L are schematics of each step of a call using the new system. FIG. 3A illustrates that the call is originated for a subscriber that has the present system from a subscriber set 336 and is transmitted as shown by arrow 401 by the link 326 to and through the wire (wireline) or wireless networks 300. FIG. 3b illustrates how that call is then transmitted as shown by arrow 402 along link 334 from or through the networks 300 to the MSC 320. FIG. 3C illustrates that, as shown by arrow 403, that the MSC 320 detects the feature and routes the call along link 350 to the feature server 322 instead of the called subscriber.

Figure 3D:
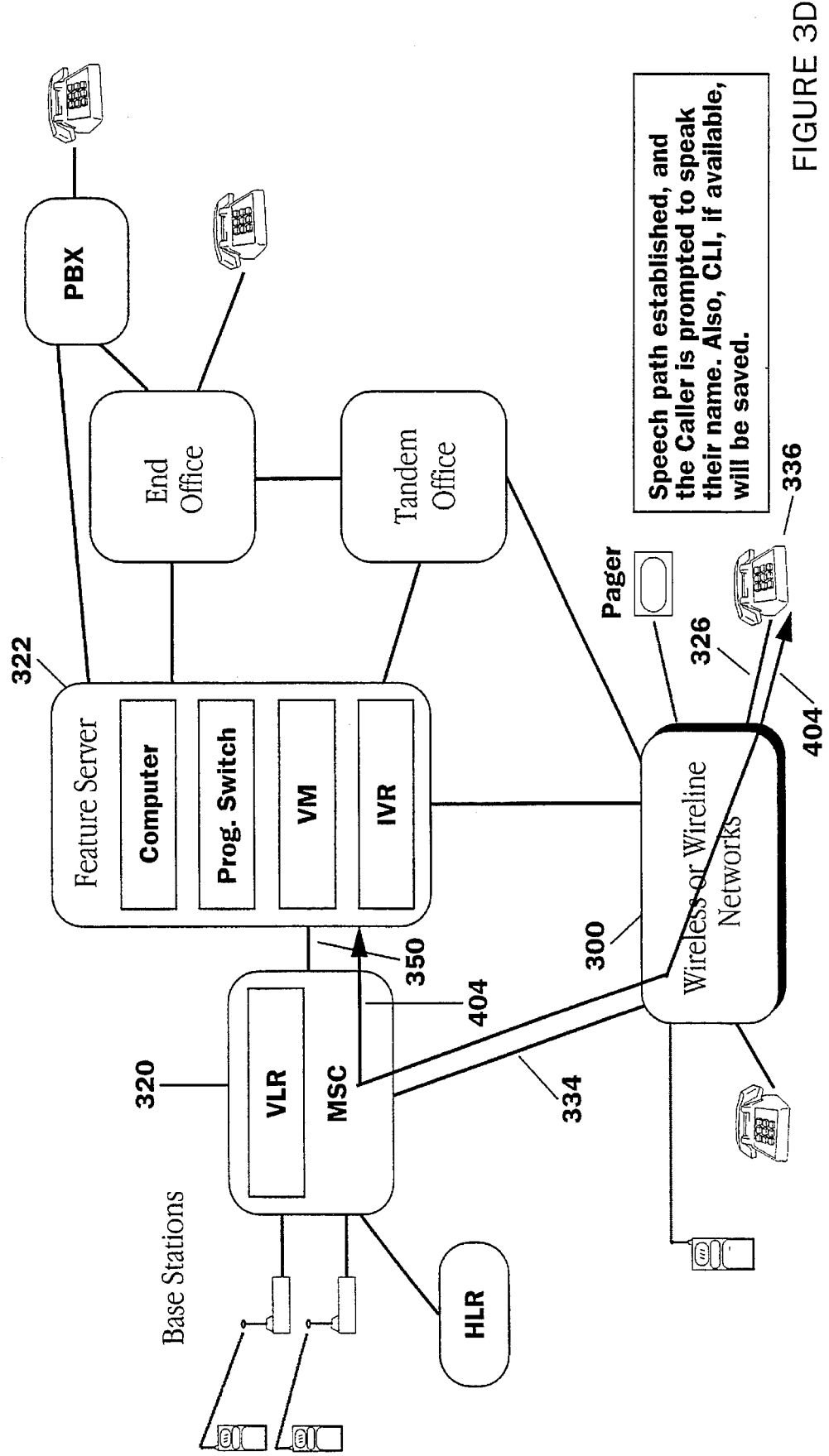
Figure 3E:
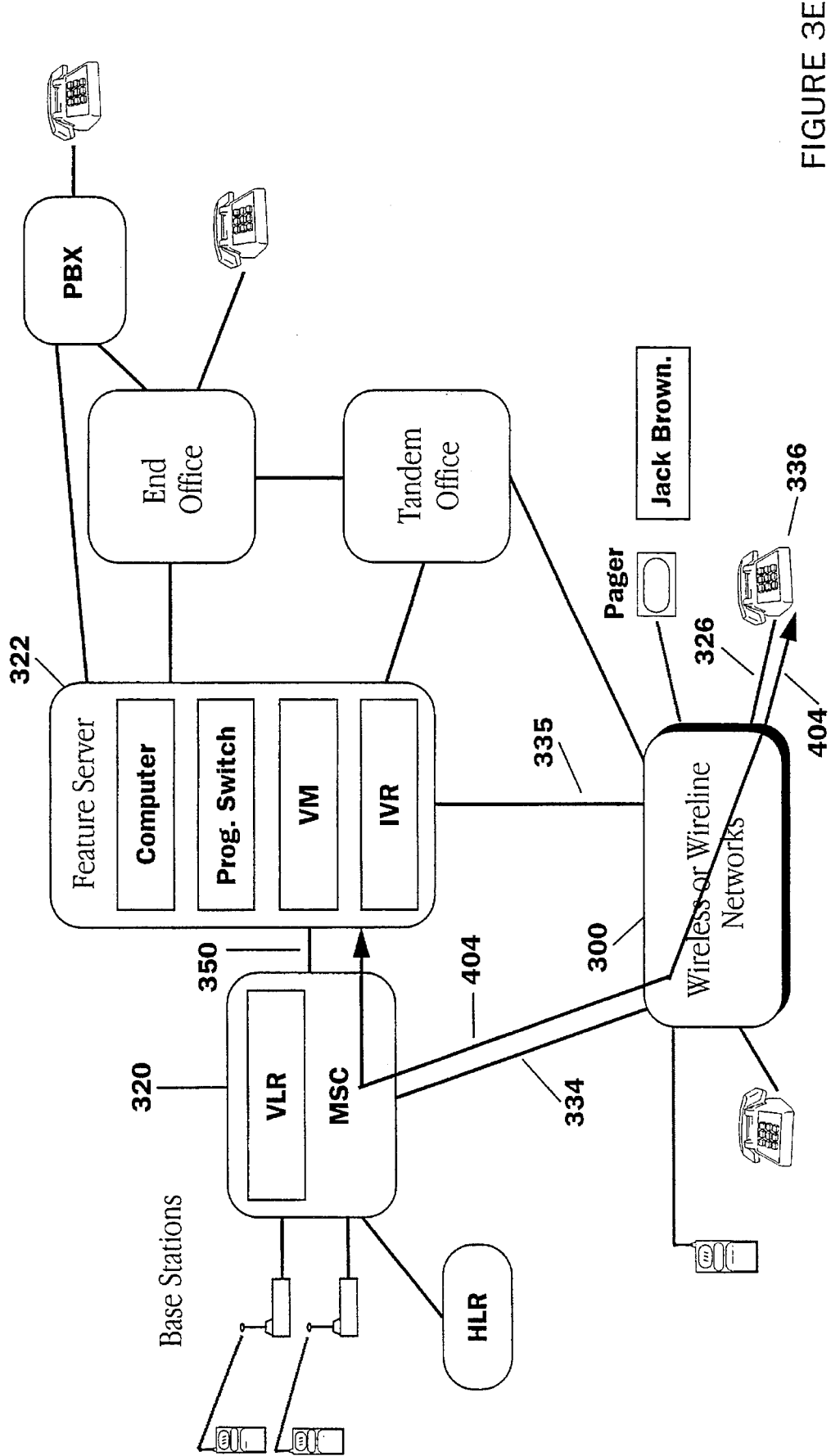
Figure 3F:
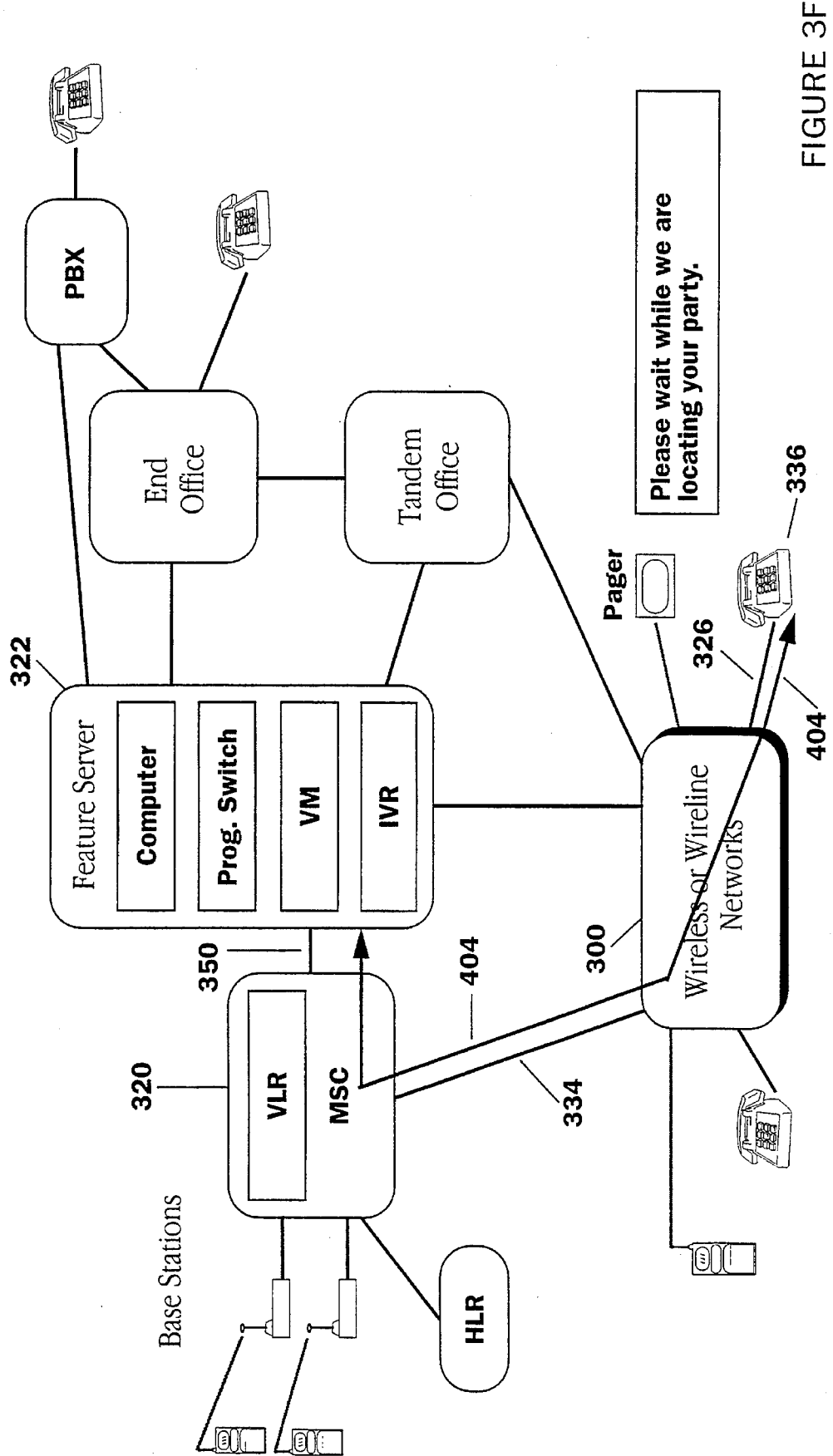

Referring to FIG. 3D, the speech path from the subscriber telephone 336 through link 326, and the networks 300, link 334, the MSC 320, and link 350 into the feature server 322 is established. The system, if programmed and available, checks the CLI against the pass-through list. If the number is in the list, the call will be directly connected to the called party phone. If the number is not in the pass-through list than the CLI will be checked against the screen caller list. If the CLI is in the screen caller list, the call will be connected to the preprogrammed default number, such as voice mail. Otherwise, the system answers the call and plays the announcement prompting the caller, as shown in step 20 of FIG. 2A, to speak his or her name. Then, as shown in FIGS. 3E and 3F and step 30 in FIG. 2A, the name, such as, for example, Jack Brown, will be given by the caller, and the IVR 348 will prompt the caller to wait while the system is locating the called subscriber or party.

Figure 3G:
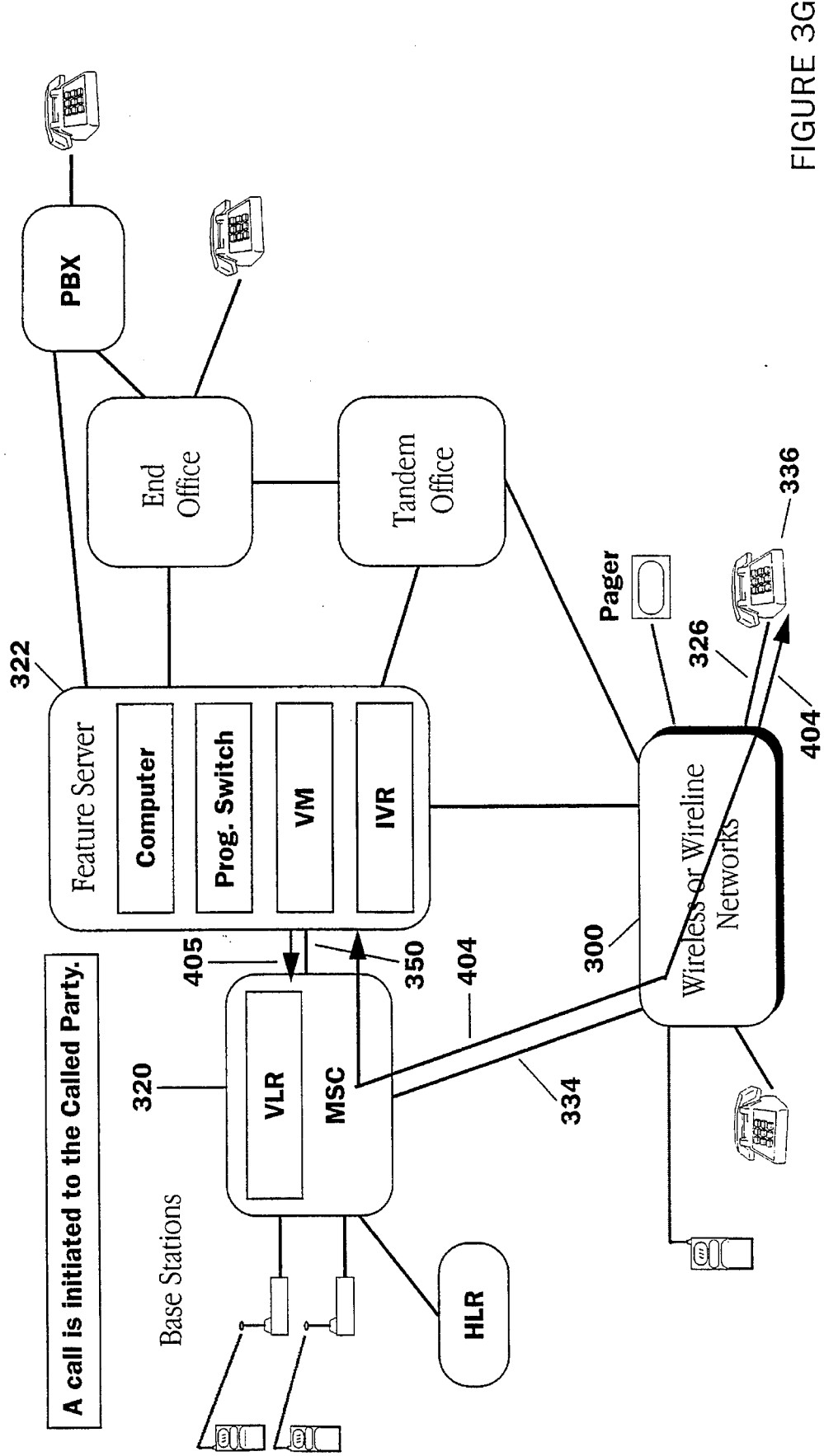
Figure 3H:
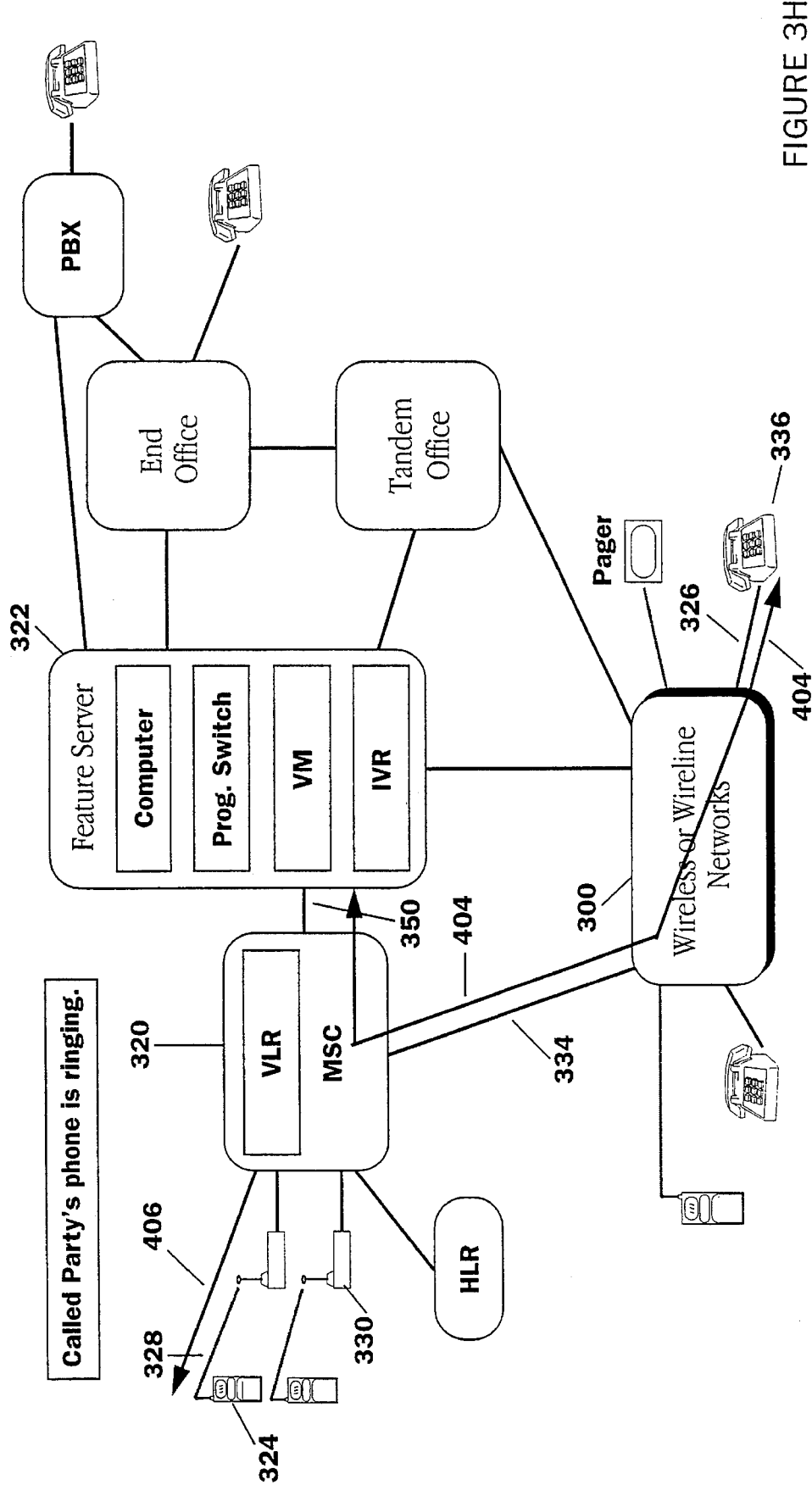
Figure 31:
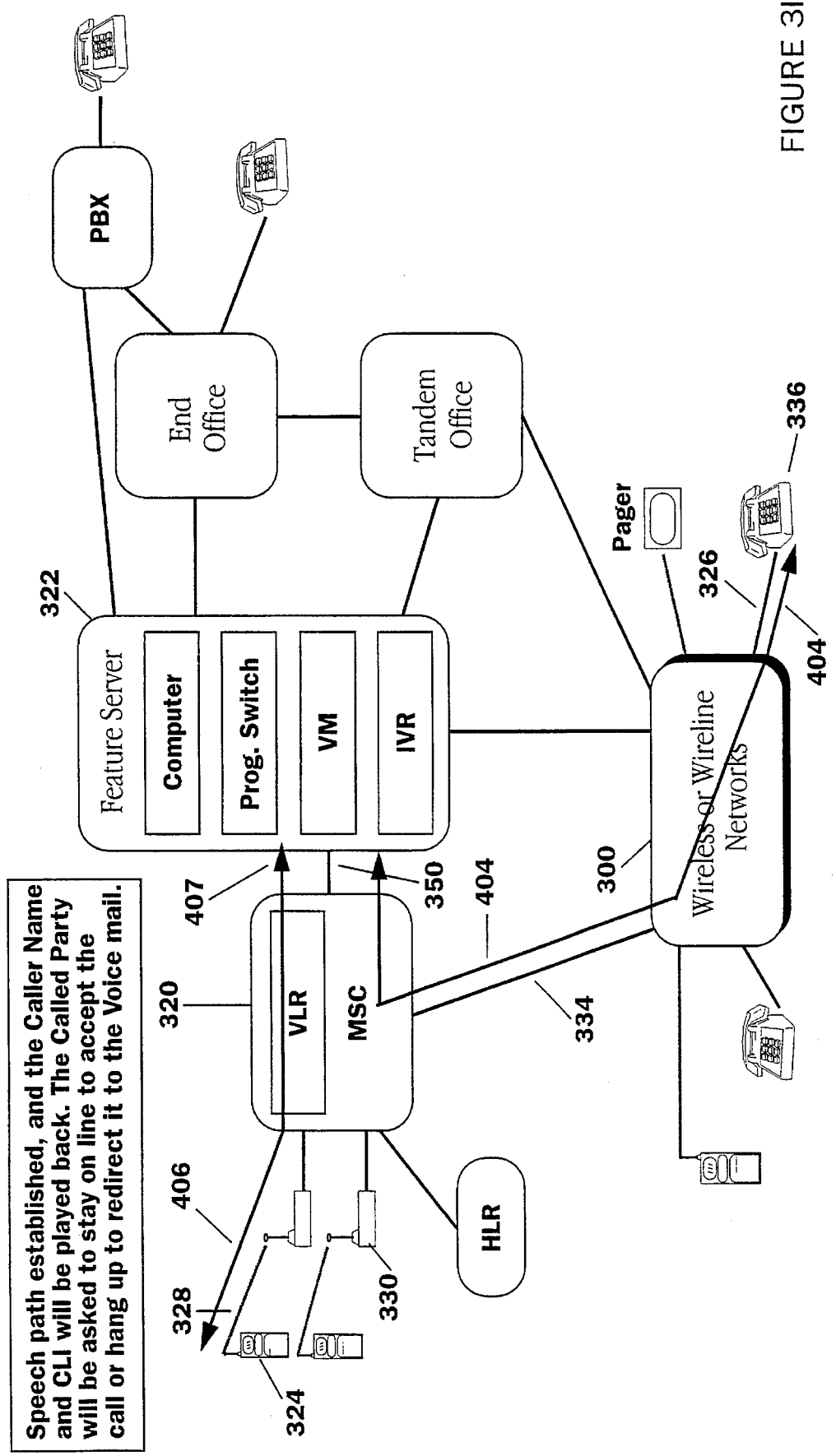

As shown in step 40 of FIG. 2A and FIG. 3G, a call is initiated to the called party following the path shown as 405 and 404. In particular, the call exits the feature server 322 to the MSC 320.

Next, a signal is sent from the MSC 320 through the base station 330, link 328 to the called party 324, as shown as path 406. By path 406, the called party's telephone is ringing. If the speech path is established as shown in step 60 of FIG. 2A and FIG. 3I, the caller name and the CLI will be played back. The called party will be asked to stay on the line to accept the call. If the caller hangs-up, as shown in step 70 of FIG. 2A, the call is redirected to a default route, such as, for example, VM 344 at the feature server 322 as shown by path 407 in FIG. 3I.

Figure 3J:
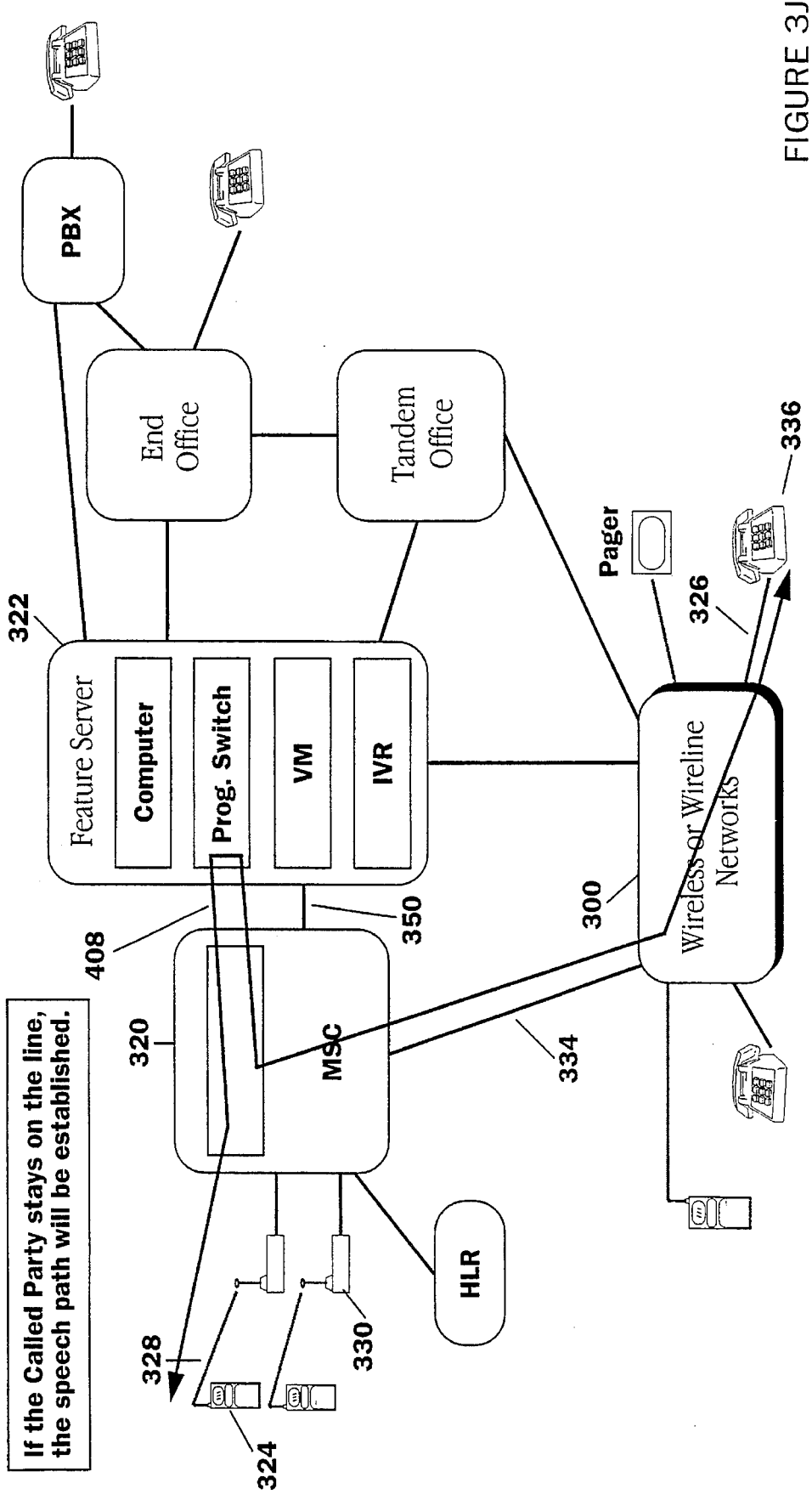
Figure 3K:
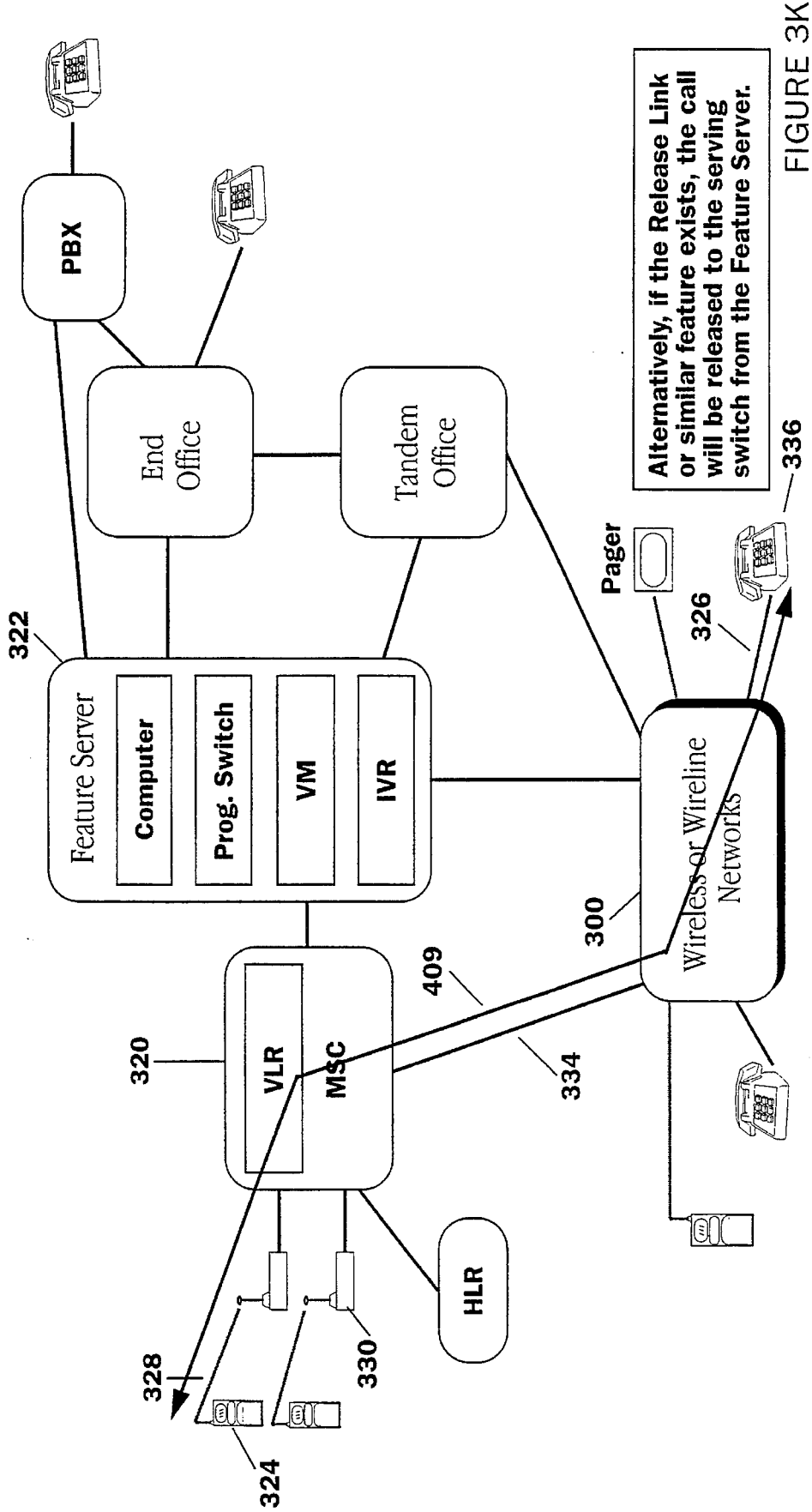

If the called party stays on the line, the speech path will be established through the feature server 322 and MSC 320 as shown by path 408 in FIG. 3J. Alternatively, if a release link or similar feature exists step 230 in FIG. 2C, the call will be released as shown in FIG. 3K.

Figure 3L:
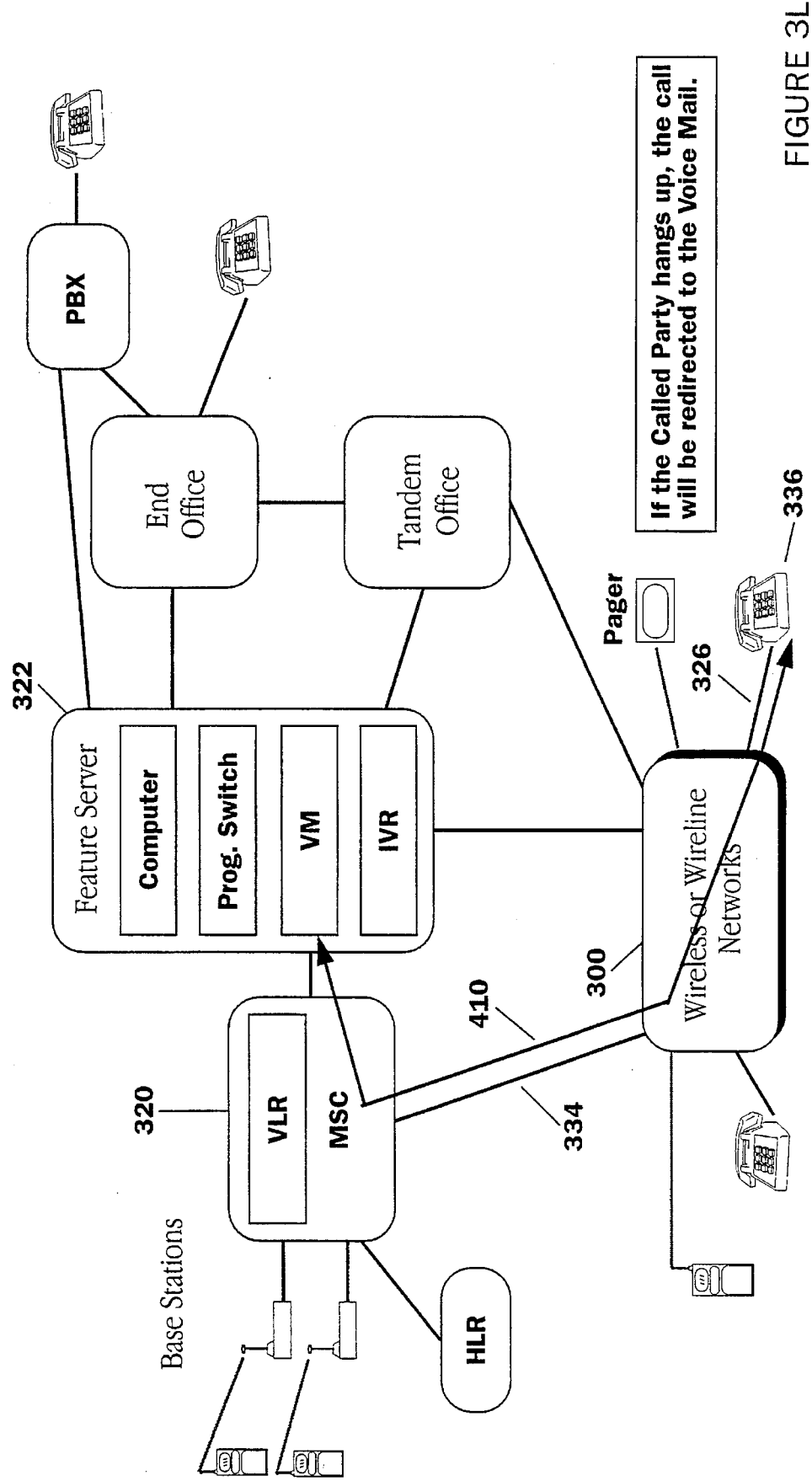

When the called party hangs-up or called party does not answer within a preprogrammed time or some preprogrammed ring count, the call will be redirected to the voice mail as shown by path 410 in FIG. 3L.

As stated before, the present system has been described for a cellular call scenario so that the MSC 320 is used. The virtually same call scenario can be used for a landline or fixed subscriber. In case the MSC or other offices are capable of IN/AIN type signalling, than the programmable switch 342 may be eliminated. The MSC or other offices can then be controlled using the IN/AIN SCP/adjunct interface to switch the call to the IVR, VM or other lines under the control of the feature server.

Referring to FIG. 4, the elements of the IN/AIN architecture is illustrated. The controlling logic of the present system can be programmed on an adjunct or service control point (SCP) that can control the switching capabilities of a service switch point (SSP) or MSC to switch the call to an IVR or VM within an IP.

In IN/AIN, SSP or MSC functionality allows a switching system to identify calls that require special service logic involvement, and starts dialogue with an SCP in which the logic for the requested service resides. SCPs contain the service logic and data used to provide such services. They can instruct, through AIN messages, an SSP or MSC to perform switching and monitoring functions. IPs contain functionality and resources needed to exchange information with an end users, such as voice announcements and DTMF digit collection capabilities. An adjunct, like the SCP, contains logic and data to support AIN services. However, unlike the SCP, it controls only a single switch.

Figure 4A:
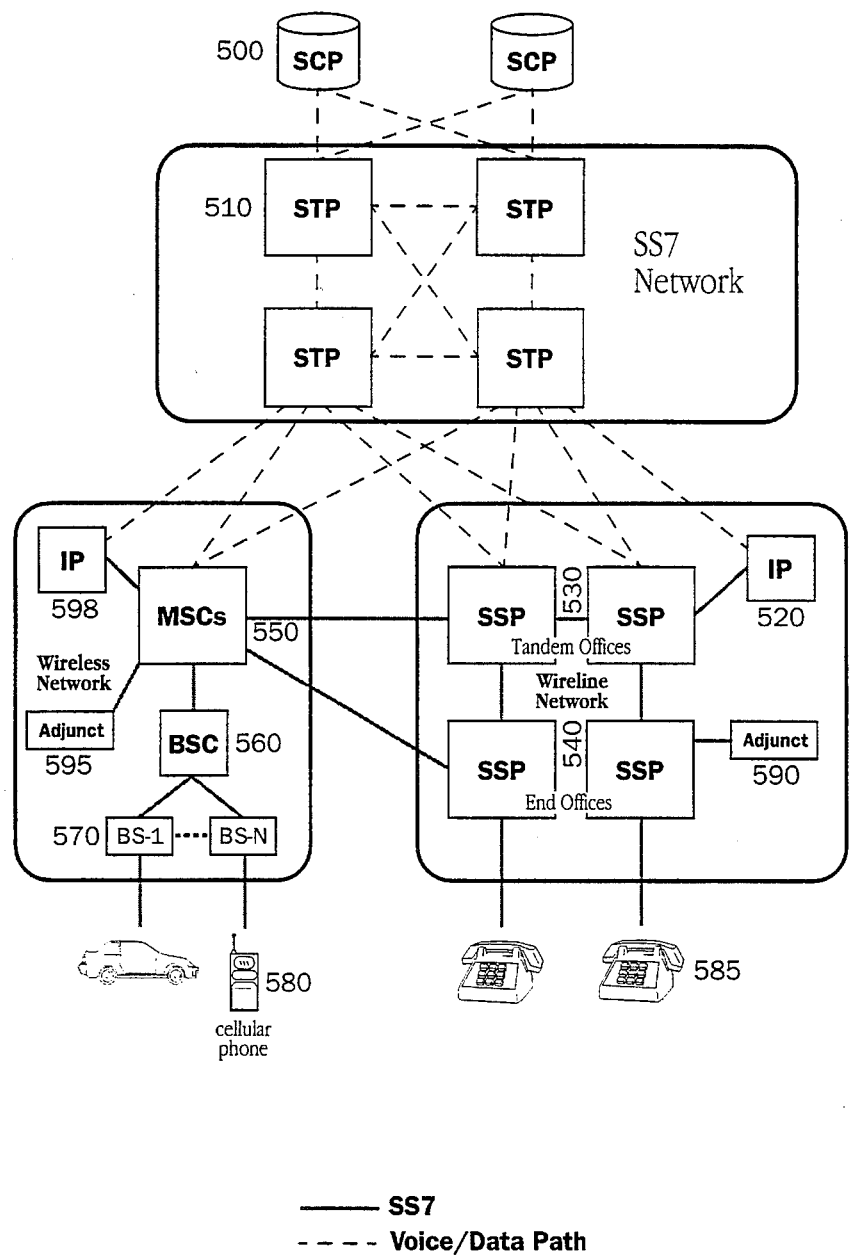
FIGS. 4a to 4H are schematics of another embodiment of the present system.
Figure 4B:
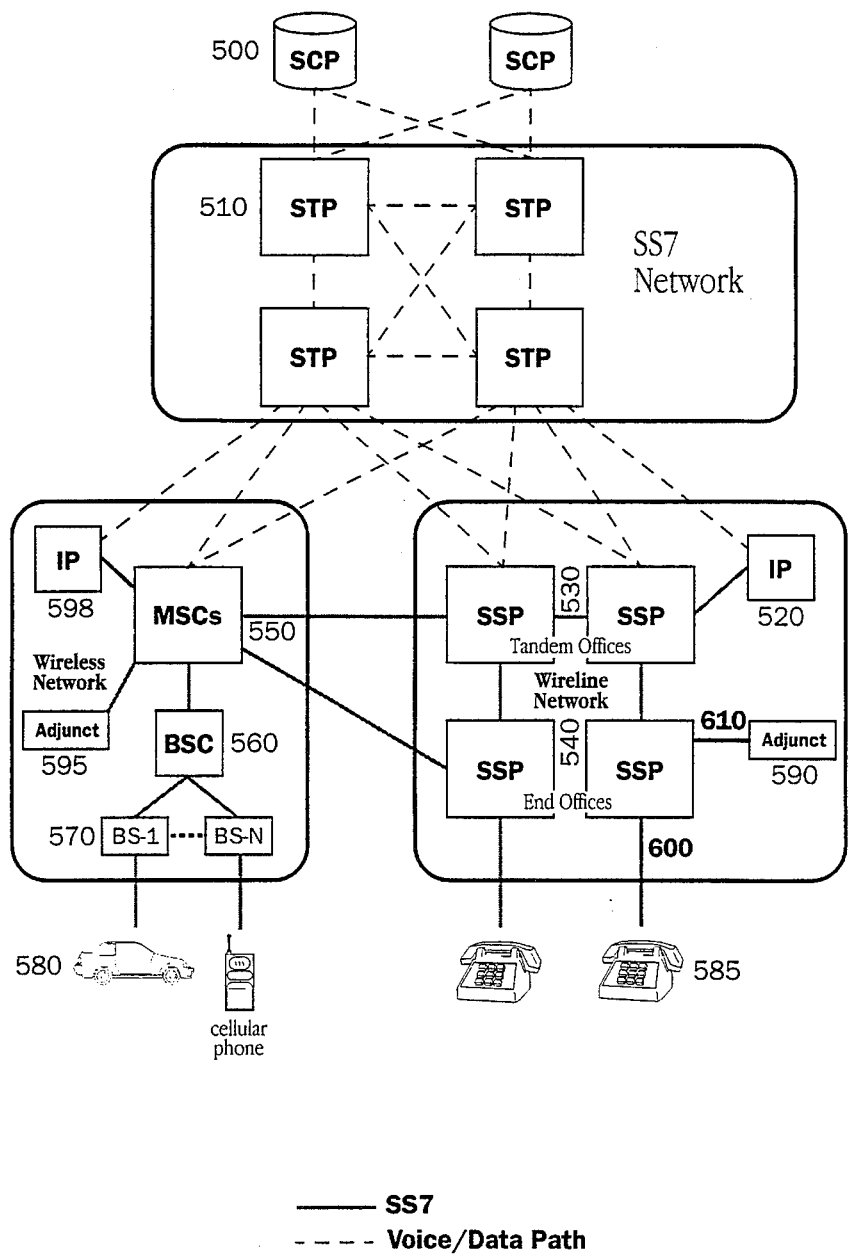
Figure 4C:
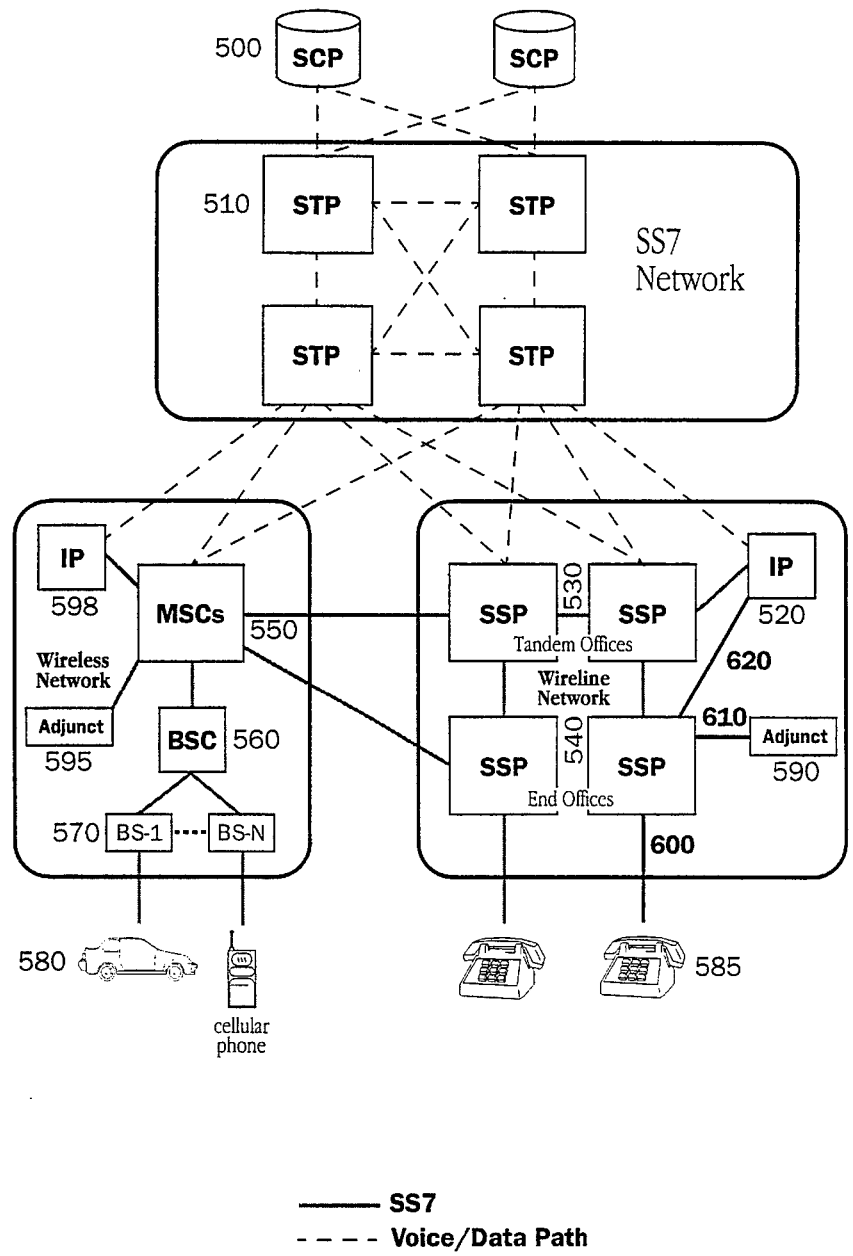

FIGS. 4A through 4H are schematics of each step of a call exercising the present system implemented on the IN/AIN network. FIG. 4A illustrates that the call originates from a subscriber set 585. Then, the speech path 600 between the subscriber set 585 and the service switch point (SSP) serving it (540) is established. The SSP detects the feature and set up a control link 610 with the adjunct 590, as shown in FIG. 4B. The adjunct-based service logic can then make all checks described under the feature server scenario, and upon deciding to prompt the caller for identification, instructs the SSP 540 to route the call to the IVR in IP 520. The speech path 620 is established as illustrated in FIG. 4C. The IVR prompts the caller for his or her name, records the name and instructs the caller to stay on line while the system is locating the called party or subscriber.

Figure 4D:
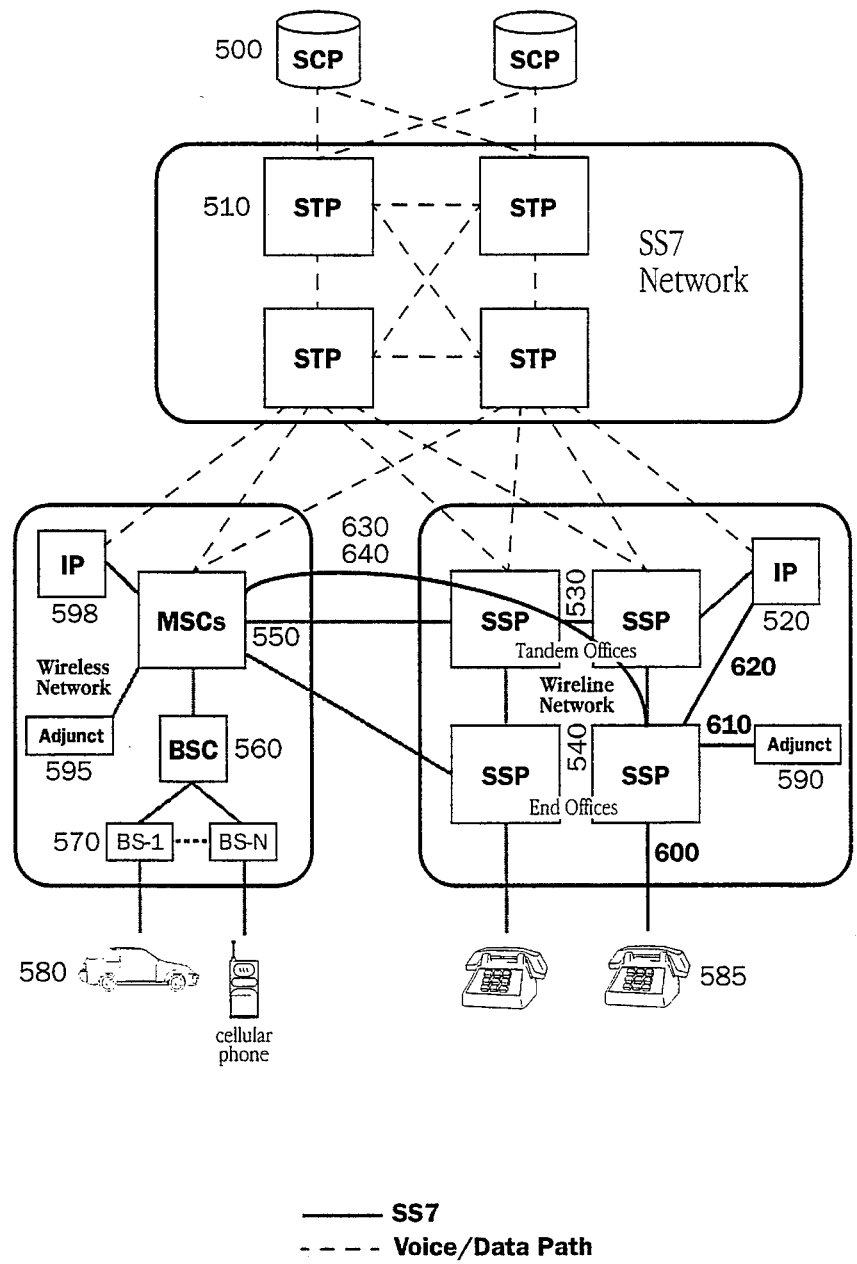
Figure 4E:
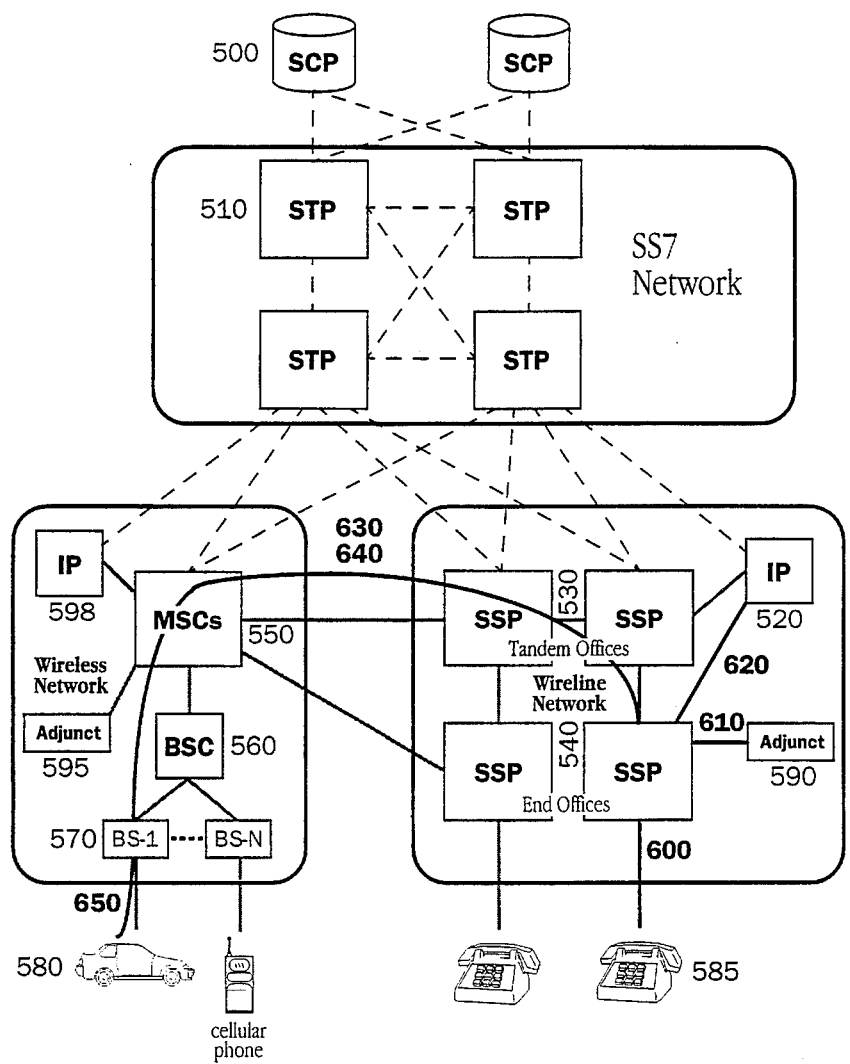
Figure 4F:
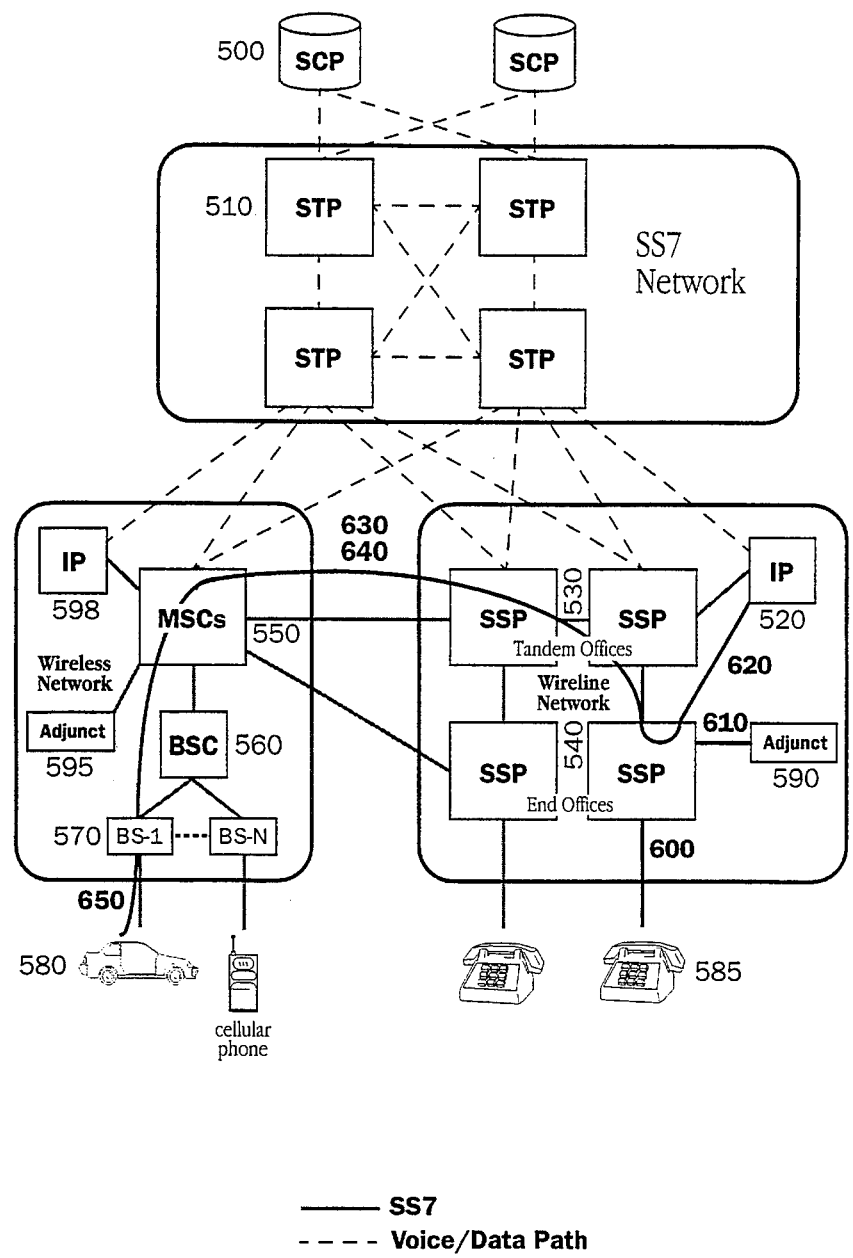

Then, as shown in FIG. 4D, per instructions from adjunct 590, the SSP 540 initiates a call to the called party or subscriber following the path shown as 630 and link 640 (through the network) to the MSC 550. Next, a signal is sent from the MSC 550 through the base station (BS) 570 and link 650, to the called party 580 (see FIG. 4E). After the called party answers, adjunct 590 instructs SSP 540 to play the recorded identification from the IVR in the IP via speech path 620 between the IP and the SSP by switching 620 over to 630 (see FIG. 4F).

Figure 4G:
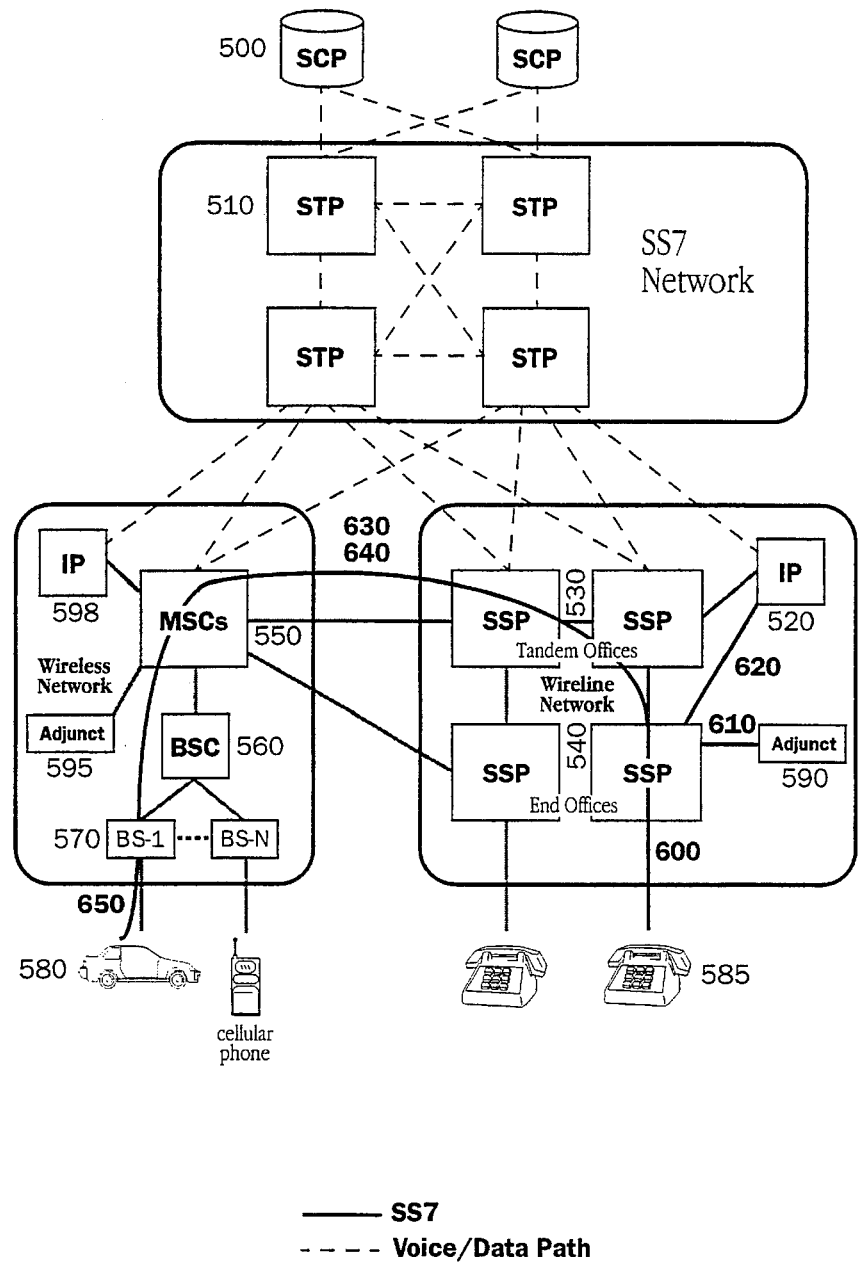
Figure 4H:
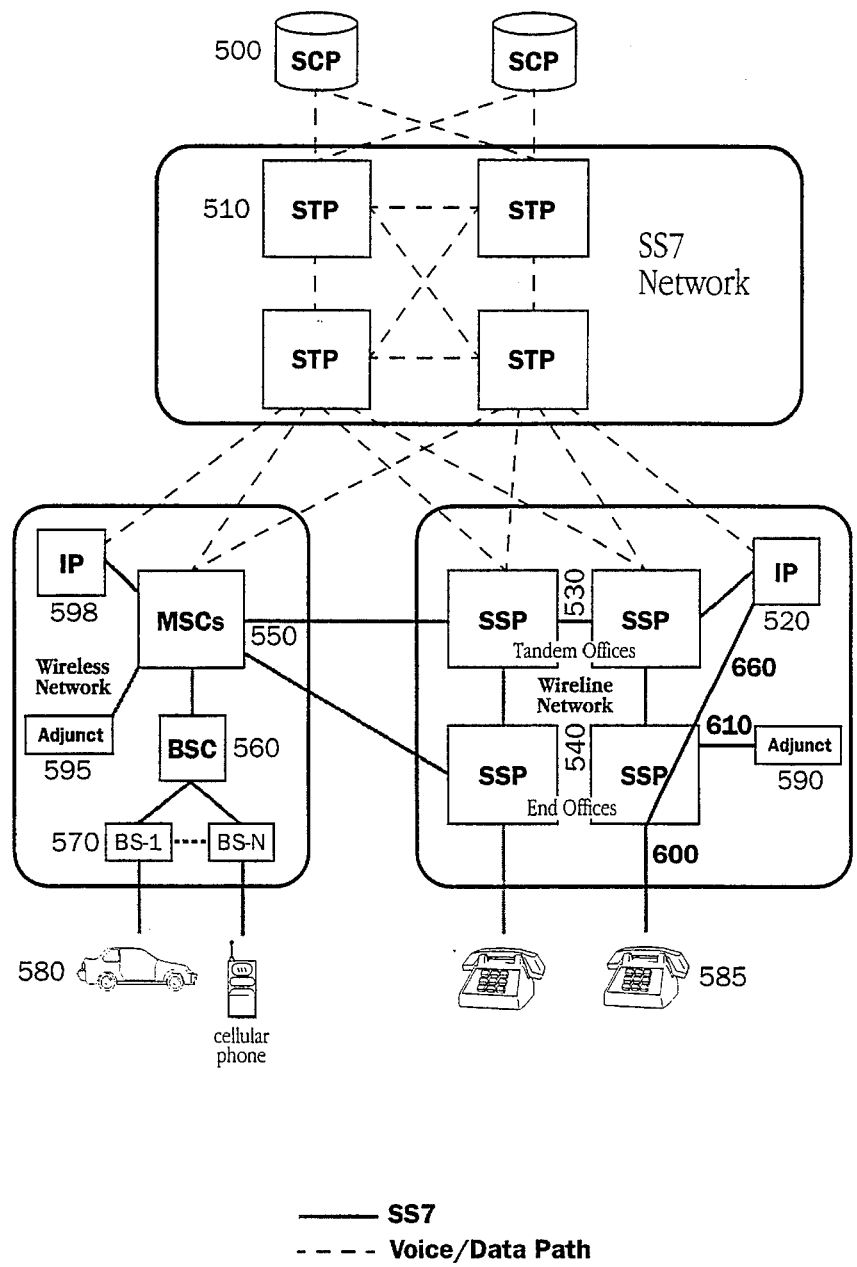

If the called party stays on line, adjunct 590 instructs SSP 540 to release 620, and connect 630 and 600, as shown in FIG. 4G. If the called party hangs up or does not answer, adjunct 590 tells SSP 540 to release speech and link paths to the called party and instead redirect the call to the voice mail in IP via path 660 as in FIG. 4H. In either case, the link 610 to adjunct 590 from SSP 540 is released by the SSP per request from the adjunct.

The above scenario could involve an SCP instead of an adjunct, and yet follow the same basic flow.

Having thus described the invention with particular references to the preferred forms thereof, it will be obvious that various changes and modifications may be made therein without departing from the spirit and scope of the invention as defined by the appended claims.

Wherefore, we claim:

1. A telecommunication system involving caller name delivery service, the system comprises:

means for intercepting a call from a calling subscriber to a desired called subscriber;

means, responsive to receipt of the intercepted call, for playing a called subscriber announcement requesting voice identification of the calling subscriber;

means for recording a voice identification on a recording medium;

means for reviewing a caller screen list of undesired calls to determine whether the intercepted call is on the caller screen list;

means for initiating a call to the called subscriber and transmitting to the called subscriber the recorded voice identification; and means for requesting the called party to accept the call from the calling subscriber.

2. The system according to claim 1, further comprising means for receiving a telephone number of the calling subscriber and means for playing the received telephone number in a voice format by text to speech technology or digit to speech technology and in which the initiating means transmits the received telephone number to the called subscriber.

3. The system according to claim 1, further comprising means, after intercepting the call from the calling subscriber, for prompting the calling subscriber to either speak his or her name, or speak or punch a pin number.

4. The system according to claim 3, further comprising means, responsive to entry of the pin number, for checking to determine whether there is authorization to receive the call from the calling subscriber and, if authorization is provided, direct routing of the call.

5. The system according to claim 3, further comprising means, responsive to recognition of the spoken name by a speech recognition technology, for checking to determine whether there is authorization to receive the call from the calling subscriber and, if authorization is provided, direct routing of the call.

6. The system according to claim 3, wherein speaking the name of the calling subscriber provides recordal of the spoken name on a recording medium and initiation of the call to the called subscriber.

7. The system according to claim 1, further comprising means for reviewing a caller pass-through list of desired calls to determine whether the intercepted call is on the caller pass-through list.

8. The system according to claim 3, further comprising means, after the prompting means prompts the calling subscriber, for reviewing caller screen and caller pass-through lists to determine whether the intercepted call is on either list.

9. The system according to claim 1, further comprising means for playing the voice identification in a voice format having the capabilities of text to speech technology or digit to speech technology.

10. The system according to claim 1, wherein the requesting means provides the called subscriber with a plurality of options to accept the call from the calling subscriber.

11. The system according to claim 10, wherein the plurality of options includes dialing a digit, speaking a digit, prompting with "yes" or "no", voice detection, speaking the name of the place or person to reroute and staying on the line for a predetermined period of time.

12. The system according to claim 11, wherein staying on the line provides a connection to the called subscriber.

13. The system according to claim 12, further comprising means, responsive to the connection to the called subscriber, for transferring the call to one of either a desired voice mail means and to an alternative number, if the called subscriber does not answer.

14. A method for telecommunications involving caller name delivery service, the method comprising:

intercepting a call from a calling subscriber to a desired called subscriber;

playing a called subscriber announcement requesting voice identification from the calling subscriber of the intercepted call;

recording a voice identification from the calling subscriber on a recording medium;

reviewing a caller screen list of undesired calls to determine whether the intercepted call is on the caller screen list;

initiating a call to the called subscriber and transmitting to the called subscriber the recorded voice identification;

playing the recorded voice identification in a voice format; and requesting the called party to accept the call from the calling subscriber by a plurality of means.

15. The method according to claim 14, further comprising prompting, after intercepting the call, the calling subscriber to either speak his or her name, or speak or enter a pin number.

16. The method according to claim 15, wherein the step of entering the pin number includes checking to determine whether there is authorization to receive the call from the calling subscriber and, if authorization is provided, direct routing of the call.

17. The method according to claim 15, wherein the step of prompting the calling subscriber includes recognizing the spoken name by a speech recognition technology, and checking to determine whether there is authorization to receive the call from the calling subscriber and, if authorization is provided, direct routing of the call.

18. The method according to claim 15, wherein speaking the name of the caller, provides recording of the spoken name and initiating of the call to the called subscriber.

19. The method according to claim 14, further comprising reviewing, after intercepting the call, a caller pass-through list of desired calls to determine whether the intercepted call is on the caller pass-through list.

20. The method according to claim 14, further comprising reviewing, after prompting the caller, a caller screen list and a caller pass-through list to determine whether the intercepted call is on either list.

21. The method according to claim 14, wherein the voice identification is played in a voice format using text to speech technology or using digit to speech technology.

22. The method according to claim 14, wherein the step of requesting by the plurality of means includes dialing a digit, speaking a digit, prompting with "yes" or "no", detecting a grunt, speaking the name of the place or person to reroute and staying on the line for a predetermined period of time.

23. The method according to claim 22, wherein staying on the line provides a connection to the called subscriber.

24. The method according to claim 23, wherein the connection provides for transferring the call to either a desired voice mail means if so programmed or to an alternative number if the called subscriber does not answer.

* * * * *